US012811224B2

(12) United States Patent
Ooka

(10) Patent No.: US 12,811,224 B2
(45) Date of Patent: Nov. 24, 2026

(54) BATTERY CELL

(71) Applicant: AESC JAPAN LTD., Kanagawa (JP)

(72) Inventor: Aika Ooka, Kanagawa (JP)

(73) Assignee: AESC JAPAN LTD., Kanagawa (JP)

(*) Notice: Subject to any disclaimer, the term of this patent is extended or adjusted under 35 U.S.C. 154(b) by 518 days.

(21) Appl. No.: 18/355,137

(22) Filed: Jul. 19, 2023

(65) Prior Publication Data

US 2024/0030523 A1 Jan. 25, 2024

(30) Foreign Application Priority Data

Jul. 25, 2022 (JP) ................................ 2022-117769
Jul. 28, 2022 (JP) ................................ 2022-120262
Aug. 4, 2022 (JP) ................................ 2022-124575
Sep. 20, 2022 (JP) ................................ 2022-148824

(51) Int. Cl.
*H01M 50/171* (2021.01)
*H01M 50/176* (2021.01)
*H01M 50/186* (2021.01)

(52) U.S. Cl.
CPC ....... *H01M 50/171* (2021.01); *H01M 50/176* (2021.01); *H01M 50/186* (2021.01)

(58) Field of Classification Search
CPC . H01M 50/171; H01M 50/186; H01M 50/176
USPC .......................................................... 429/163
See application file for complete search history.

(56) References Cited

U.S. PATENT DOCUMENTS

2003/0215709 A1 11/2003 Hosokawa et al.
2005/0181242 A1 8/2005 Suzuki et al.
2006/0099501 A1 5/2006 Kim et al.
2007/0160904 A1 7/2007 Uh
2011/0086262 A1 4/2011 Kim et al.
2012/0189899 A1* 7/2012 Kanda ................. H01M 50/564 29/730
2014/0302381 A1 10/2014 Song et al.
2016/0260939 A1* 9/2016 Horikoshi ........... H01M 50/107
2017/0040634 A1 2/2017 Bae et al.
2017/0104193 A1 4/2017 Kang
2017/0301896 A1* 10/2017 Tajima ................ H01M 50/178
2020/0014081 A1 1/2020 Lee

FOREIGN PATENT DOCUMENTS

CN 102064338 A 5/2011
CN 102208672 A 10/2011
CN 104134763 A 11/2014
CN 110419139 A 11/2019
EP 1981100 A1 10/2008
EP 2424008 A1 2/2012
EP 2424008 B1 3/2015
EP 3174126 A1 5/2017
EP 1981100 B1 7/2017
JP 08329972 A 12/1996

(Continued)

*Primary Examiner* — James M Erwin
(74) *Attorney, Agent, or Firm* — Rankin, Hill & Clark LLP

(57) ABSTRACT

A battery cell includes a battery element, a positive electrode tab electrically connected to the battery element, a front lid member covering one end of the battery element with the positive electrode tab drawn from the front lid member, and a front bonding member bonding the front lid member and the positive electrode tab to each other.

16 Claims, 28 Drawing Sheets

(56) References Cited

FOREIGN PATENT DOCUMENTS

| | | | | |
|---|---|---|---|---|
| JP | 09246120 | A | | 9/1997 |
| JP | 2001-057182 | A | | 2/2001 |
| JP | 2001325925 | A | | 11/2001 |
| JP | 2003045378 | A | | 2/2003 |
| JP | 2003-288883 | A | | 10/2003 |
| JP | 2004014189 | A | | 1/2004 |
| JP | 2004220820 | A | | 8/2004 |
| JP | 3602797 | B2 | | 12/2004 |
| JP | 2006128126 | A | | 5/2006 |
| JP | 2006202652 | A | | 8/2006 |
| JP | 2008-198484 | A | | 8/2008 |
| JP | 2009518789 | A | | 5/2009 |
| JP | 2010219024 | A | | 9/2010 |
| JP | 2011108623 | A | † | 6/2011 |
| JP | 2011210662 | A | † | 10/2011 |
| JP | 2012099252 | A | | 5/2012 |
| JP | 2013097890 | A | | 5/2013 |
| JP | 2013127989 | A | | 6/2013 |
| JP | 2014-072018 | A | | 4/2014 |
| JP | 2014216307 | A | † | 11/2014 |
| JP | 2015228319 | A | | 12/2015 |
| JP | 2018160398 | A | | 10/2018 |
| JP | 2019145755 | A | † | 8/2019 |
| JP | 6986184 | B1 | | 12/2021 |
| JP | 2023-084025 | A | | 6/2023 |
| KR | 20180026946 | A | | 3/2018 |
| KR | 20180091324 | A | | 8/2018 |
| KR | 20180117783 | A | | 10/2018 |
| KR | 102251329 | B1 | | 5/2021 |
| WO | 2021075733 | A1 | | 4/2021 |
| WO | 2021/157731 | A1 | | 8/2021 |
| WO | 2022018573 | A1 | | 1/2022 |

* cited by examiner
† cited by third party

BATTERY CELL

This application is based on Japanese patent application NO. 2022-117769, filed on Jul. 25, 2022, Japanese patent application NO. 2022-120262, filed on Jul. 28, 2022, Japanese patent application NO. 2022-124575, filed on Aug. 4, 2022, and Japanese patent application NO. 2022-148824, filed on Sep. 20, 2022, the content of which is incorporated hereinto by reference.

TECHNICAL FIELD

The present invention relates to a battery cell.

BACKGROUND ART

In recent years, various structures of a battery cell such as a lithium-ion secondary battery cell have been developed. For example, a battery cell described in WO 2021/157731 A1 and JP 2011-108623 A includes a battery element, two lid members, and an exterior film. The two lid members cover both end portions of the battery element in a longitudinal direction. The exterior film is wrapped around the longitudinal direction of the battery element.

SUMMARY

Aspect 1

For example, in the battery cell described in WO 2021/157731 A1 and JP 2011-108623 A, a tab electrically connected to the battery element may be drawn through a hole or a notch provided in the lid member. In this case, however, moisture and gas may pass through a gap between the tab and the lid member. This may make it difficult to improve a sealing property of the battery cell.

One example of an object of aspect 1 according to the present invention is to improve a sealing property of a battery cell. Another object of aspect 1 according to the present invention will become apparent from the description of the present specification.

Aspect 2

For example, in the battery cell described in WO 2021/157731 A1, the lid member may be formed of a resin having relatively high moisture permeability and gas permeability. In this case, however, it may be difficult to suppress permeation of moisture and gas through the lid member. This may make it difficult to improve a sealing property of the battery cell.

One example of an object of aspect 2 according to the present invention is to improve a sealing property of a battery cell. Another object of aspect 2 according to the present invention will become apparent from the description of the present specification.

Aspect 3

For example, in the battery cell described in JP 2011-108623 A, a wrinkle may be formed in the exterior film due to a distortion in a shape of the exterior film. The presence of the wrinkle of the exterior film around the battery element may however cause transfer of the wrinkle to the battery element. This may make the wrinkle affect a characteristic of the battery cell.

One example of an object of aspect 3 according to the present invention is to stabilize a characteristic of a battery cell. Another object of aspect 3 according to the present invention will become apparent from the description of the present specification.

Aspect 4

A certain request such as improvement of a volume energy density may decrease a thickness of a lid member. Simply decreasing the thickness of the lid member may however make it difficult to secure strength of the lid member.

One example of an object of aspect 4 according to the present invention is to decrease a thickness of a lid member with assurance of strength of the lid member. Another object of aspect 4 according to the present invention will become apparent from the description of the present specification.

Aspect 1 according to the present invention is as follows.

1.1 A battery cell including:

a battery element;

a tab electrically connected to the battery element;

a lid member covering one end of the battery element with the tab drawn from the lid member; and a bonding member bonding the tab and the lid member to each other.

1.2 The battery cell according to 1.1, wherein a notch through which the tab passes is provided in the lid member, and at least a part of the lid member exposed from the notch is not covered by the bonding member.

1.3 The battery cell according to 1.1, wherein a hole through which the tab passes is provided in the lid member, and the bonding member is provided between an outer circumferential surface of the tab and an inner circumferential surface of the hole.

Aspect 2 according to the present invention is as follows.

2.1 A battery cell including:

a battery element;

a tab electrically connected to the battery element;

a lid member covering one end of the battery element with the tab drawn from the lid member;

an exterior film at least partially wrapped around the battery element; and a barrier member provided at the lid member.

2.2 The battery cell according to 2.1, wherein, when viewed from a drawn direction of the tab, the barrier member is provided in an area of equal to or more than 85% of an entire area of the lid member.

Aspect 3 according to the present invention is as follows.

3.1 A battery cell including:

a battery element;

a tab electrically connected to the battery element via a collection portion of a current collector drawn from the battery element;

a lid member covering one end portion of the battery element with the tab drawn from the lid member; and an exterior film at least partially wrapped around the battery element, wherein a wrinkle of the exterior film is present around the collection portion of the current collector of the exterior film.

3.2 The battery cell according to 3.1, wherein, when viewed from a drawn direction of the tab, a size of the lid member is larger than a size of the battery element.

3.3 The battery cell according to 3.1, wherein, when viewed from a drawn direction of the tab, a size of the lid member is smaller than a size of the battery element.

Aspect 4 according to the present invention is as follows.

4.1 A battery cell including:

a battery element;

a lid member covering one end portion of the battery element;

an exterior film at least partially wrapped around the battery element; and a rib provided on the lid member.

4.2 The battery cell according to 4.1, wherein at least a part of the rib defines a space communicating with a housing space formed by the lid member and the exterior film.

4.3 The battery cell according to 4.1 or 4.2, further including a current collector drawn from the battery element, wherein a height of the rib in a region not overlapping the current collector in a protruding direction of the rib is higher than a height of the rib in a region overlapping the current collector in the protruding direction of the rib.

4.4 The battery cell according to 4.1 or 4.2, further including a current collector drawn from the battery element, wherein the rib is provided in a region not overlapping the current collector in a protruding direction of the rib, and the rib is not provided in a region overlapping the current collector in the protruding direction of the rib.

4.5 The battery cell according to 4.1 or 4.2, further including a current collector including a folded portion folded inside the lid member and a bent portion bent with respect to the folded portion, the current collector being drawn from the battery element, wherein a height of the rib in a region overlapping the folded portion of the current collector in a protruding direction of the rib is higher than a height of the rib in a region overlapping the bent portion of the current collector in the protruding direction of the rib.

4.6 The battery cell according to 4.1 or 4.2, further including a current collector including a folded portion folded inside the lid member and a bent portion bent with respect to the folded portion, the current collector being drawn from the battery element, wherein the rib is provided in a region overlapping the folded portion of the current collector in a protruding direction of the rib, and the rib is not provided in a region overlapping the bent portion of the current collector in the protruding direction of the rib.

According to aspect 1 of the present invention, a sealing property of a battery cell can be improved.

According to aspect 2 of the present invention, a sealing property of a battery cell can be improved.

According to aspect 3 of the present invention, a characteristic of a battery cell can be stabilized.

According to aspect 4 of the present invention, a thickness of a lid member can be decreased with assurance of strength of the lid member.

EMBODIMENT

First Embodiment

Hereinafter, a first embodiment and variants of the present invention will be described by using drawings. In all of the drawings, a similar component has a similar reference sign, and description thereof will be appropriately omitted.

Figure 1:
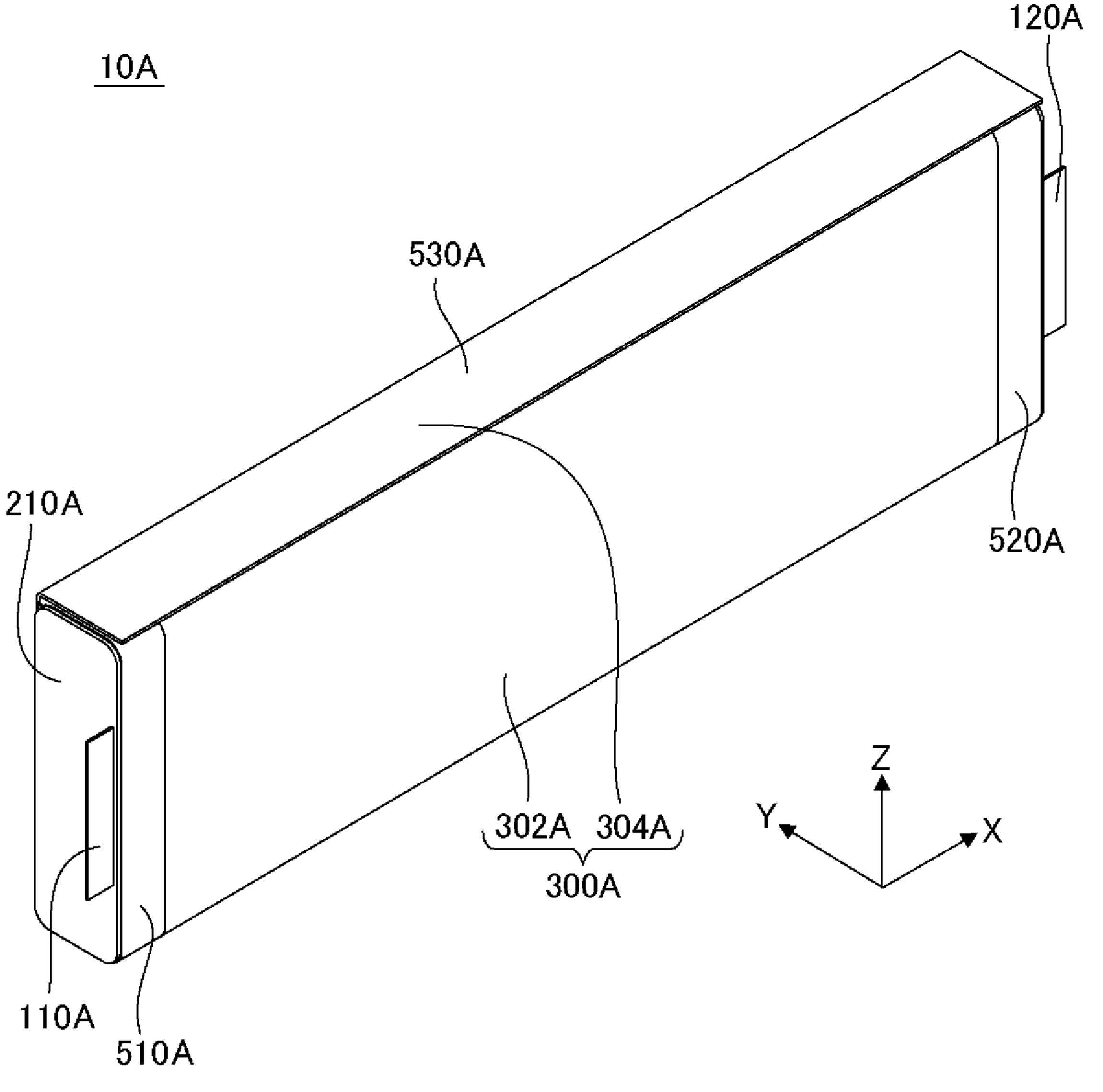
FIG. 1 is a front perspective view of a battery cell according to a first embodiment.
Figure 2:
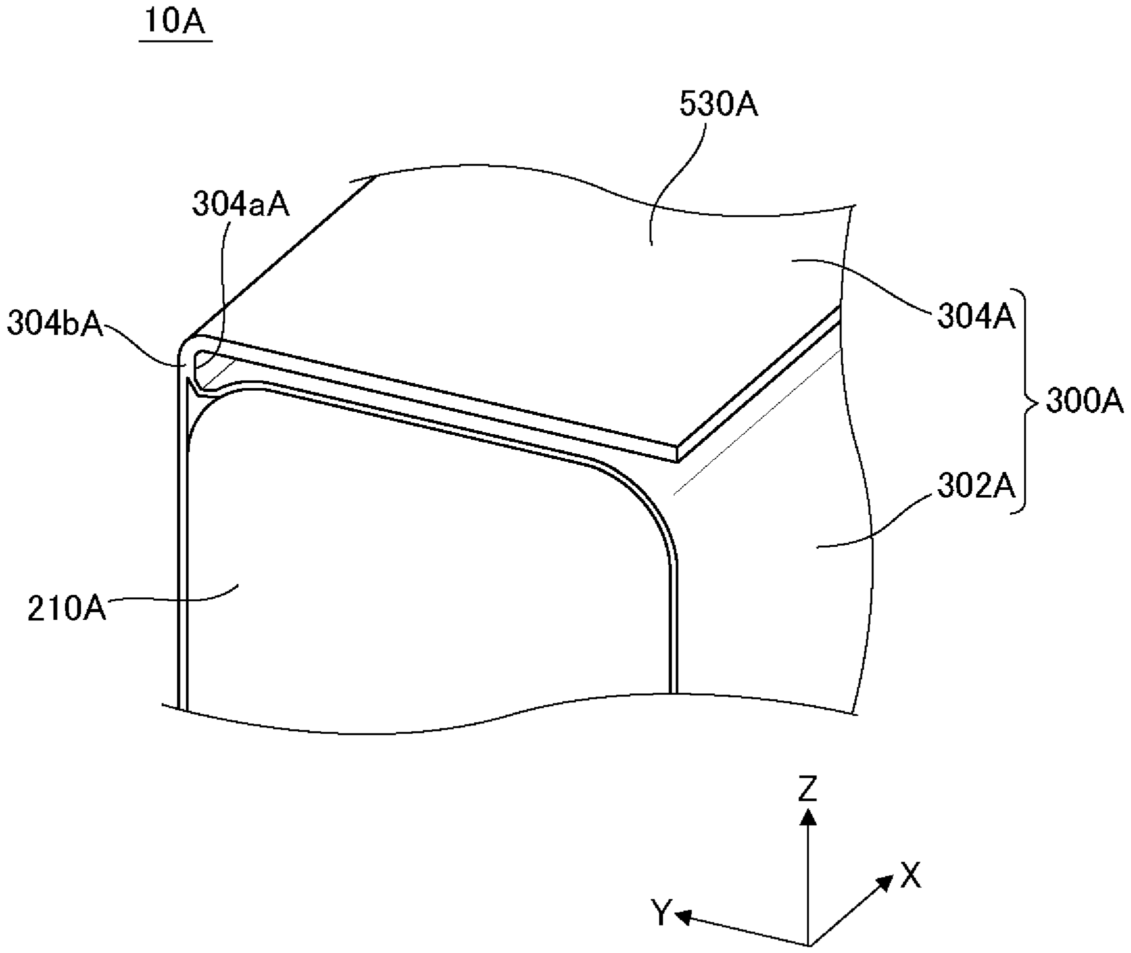
FIG. 2 is a front enlarged perspective view of a part of the battery cell according to the first embodiment.
Figure 3:
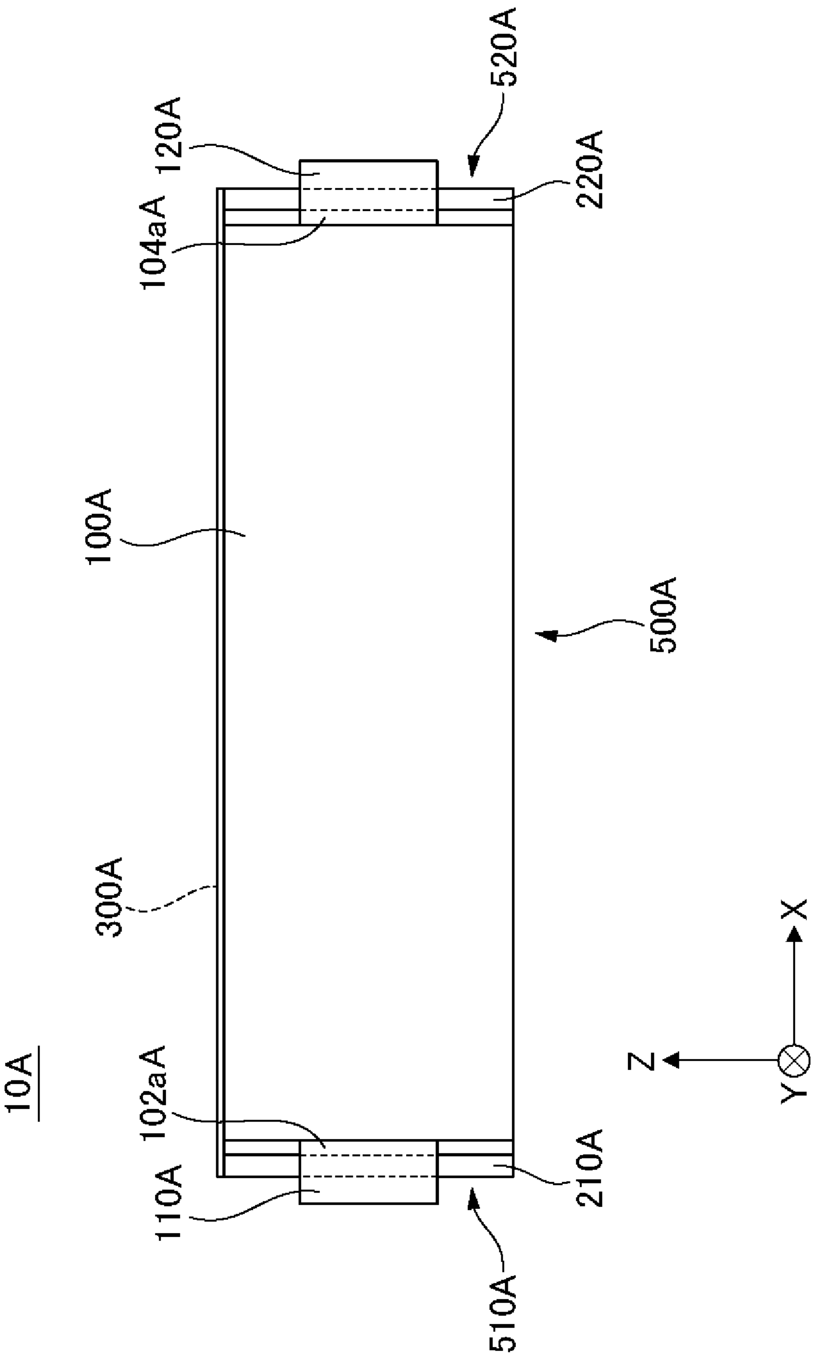
FIG. 3 is a right side view of the battery cell according to the first embodiment.
Figure 4:
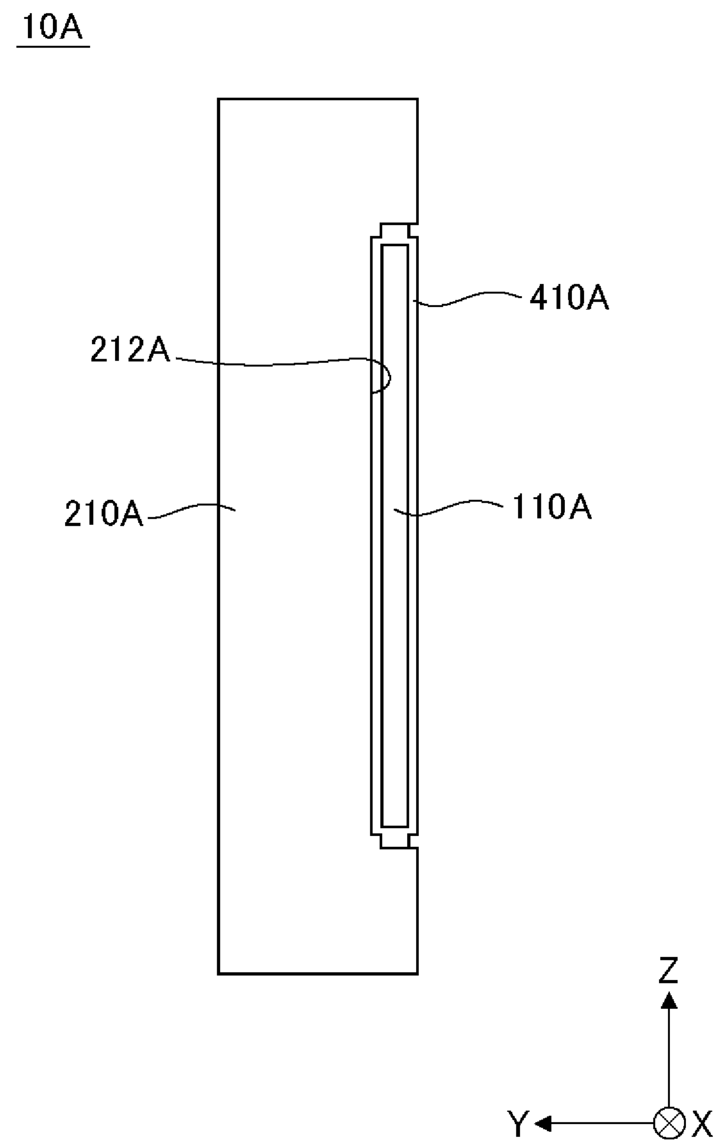
FIG. 4 is a front view of the battery cell according to the first embodiment.

FIG. 1 is a front perspective view of a battery cell 10A according to the first embodiment. FIG. 2 is a front enlarged perspective view of a part of the battery cell 10A according to the first embodiment. FIG. 3 is a right side view of the battery cell 10A according to the first embodiment. FIG. 4 is a front view of the battery cell 10A according to the first embodiment. In FIG. 3, an exterior film 300A is illustrated to be transparent for description. FIG. 4 does not illustrate the exterior film 300A.

In each drawing, an X direction, a Y direction, and a Z direction are provided for description. The X direction indicates a front-rear direction of the battery cell 10A. The Y direction is orthogonal to the X direction. The Y direction indicates a left-right direction of the battery cell 10A. The Z direction is orthogonal to both of the X direction and the Y direction. The Z direction indicates an up-down direction of the battery cell 10A. A direction pointed by an arrow indicating the X direction, a direction pointed by an arrow indicating the Y direction, and a direction pointed by an arrow indicating the Z direction are a rear direction, a left direction, and an upward direction, respectively. However, a relationship among the X direction, the Y direction, the Z direction, the front-rear direction, the left-right direction, and the up-down direction of the battery cell 10A is not limited to this example.

A white circle with an X indicating the X direction, the Y direction, or the Z direction indicate that a direction from the front to the back of the paper plane is a direction pointed by an arrow indicating the direction.

The battery cell 10A includes a battery element 100A, a positive electrode tab 110A, a negative electrode tab 120A, a front lid member 210A, a rear lid member 220A, and the exterior film 300A. The exterior film 300A includes a wrapped portion 302A and a drawn portion 304A.

The battery element 100A has an approximate rectangular cuboid shape. A longitudinal direction of the battery element 100A is substantially parallel to the X direction. A length of the battery element 100A in the X direction may be, for example, but is not limited to, equal to or more than 300 mm and equal to or less than 500 mm, preferably, equal to or less than 450 mm. A transverse direction of the battery element 100A is substantially parallel to the Z direction. A length of the battery element 100A in the Z direction may be, for example, but is not limited to, equal to or more than 90 mm and equal to or less than 130 mm, preferably, equal to or less than 120 mm. A thickness direction of the battery element 100A is substantially parallel to the Y direction. A thickness of the battery element 100A in the Y direction may be, for example, but is not limited to, equal to or more than 20 mm and equal to or less than 50 mm, preferably, equal to or less than 45 mm. However, a shape of the battery element 100A is not limited to this example.

The battery element 100A includes at least one unillustrated positive electrode, at least one unillustrated negative electrode, and at least one unillustrated separator. For example, a plurality of the positive electrodes and a plurality of the negative electrodes are alternately stacked in the Y direction. At least a part of the separator is located between the positive electrode and the negative electrode adjacent to each other in the Y direction. For example, each of a plurality of sheet-shaped separators may be located between the positive electrode and the negative electrode adjacent to each other in the Y direction. Alternatively, one sheet-shaped separator may have a fanfold shape through a region between the positive electrode and the negative electrode adjacent to each other in the Y direction. Alternatively, the positive electrode, the negative electrode, and the separator may be wound with the separator located between the positive electrode and the negative electrode. In one example, the positive electrode, the negative electrode, and the separator are wound with both sides of one of the positive electrode and the negative electrode covered by the separator. In another example, a stacked body including a plurality of unit stacked bodies including the positive electrode, the separator, and the negative electrode in this order may be wound. However, a winding structure of the positive electrode, the negative electrode, and the separator is not limited to these examples.

As illustrated in FIG. 3, the positive electrode tab 110A is disposed on the front of the battery element 100A. A rear end portion of the positive electrode tab 110A is electrically connected to a positive electrode current collector **102*a*A. The positive electrode current collector 102*a*A is drawn from the positive electrode to the front. In this way, the positive electrode tab 110**A is electrically connected to the plurality of positive electrodes.

As illustrated in FIG. 3, the negative electrode tab 120A is disposed on the rear of the battery element 100A. A front end portion of the negative electrode tab 120A is electrically connected to a negative electrode current collector **104*a*A. The negative electrode current collector 104*a*A is drawn from the negative electrode to the rear. In this way, the negative electrode tab 120**A is electrically connected to the plurality of negative electrodes.

The front lid member 210A covers a front end portion of the battery element 100A. The front lid member 210A is formed of, for example, resin, metal, or the like. A front end portion of the positive electrode tab 110A protrudes from a front surface of the front lid member 210A. When viewed from the front, the front lid member 210A has a substantially rectangular shape. When viewed from the front, a longitudinal direction of the front lid member 210A is substantially parallel to the Z direction, and a transverse direction of the front lid member 210A is substantially parallel to the Y direction.

The rear lid member 220A covers a rear end portion of the battery element 100A. The rear lid member 220A is formed of, for example, resin, metal, or the like. A rear end portion of the negative electrode tab 120A protrudes from a rear surface of the rear lid member 220A. When viewed from the rear, the rear lid member 220A has a substantially rectangular shape. When viewed from the rear, a longitudinal direction of the rear lid member 220A is substantially parallel to the Z direction, and a transverse direction of the rear lid member 220A is substantially parallel to the Y direction.

As illustrated in FIGS. 1 and 2, the wrapped portion 302A has a substantially tubular shape open toward both of the front and the rear. The front lid member 210A is disposed inside the front opening of the wrapped portion 302A. The rear lid member 220A is disposed inside the rear opening of the wrapped portion 302A. The wrapped portion 302A is wrapped one revolution around the X direction of the battery element 100A, the front lid member 210A, and the rear lid member 220A. In this way, the front lid member 210A, the rear lid member 220A, and the wrapped portion 302A form a housing space 500A that houses the battery element 100A. An unillustrated electrolytic solution is housed together with the battery element 100A in the housing space 500A. A state of wrapping of the wrapped portion 302A around the battery element 100A is not limited to the example described above.

An outer circumferential surface of the front lid member 210A around the X direction and an inner circumferential surface of the front opening of the wrapped portion 302A around the X direction are bonded to each other by thermal bonding, for example. In this way, a front sealing portion 510A is formed.

An outer circumferential surface of the rear lid member 220A around the X direction and an inner circumferential surface of the rear opening of the wrapped portion 302A around the X direction are bonded to each other by thermal bonding, for example. In this way, a rear sealing portion 520A is formed.

As illustrated in FIGS. 1 and 2, when viewed from the front, the drawn portion 304A is drawn from a corner of the wrapped portion 302A on an upper left side of the battery element 100A.

Specifically, as illustrated in FIG. 2, the drawn portion 304A includes a first drawn portion **304*a*A and a second drawn portion 304*b*A. The first drawn portion 304*a*A is drawn from one of both ends of the wrapped portion 302A in a circumferential direction around the X direction. The second drawn portion 304*b*A is drawn from the other of both ends of the wrapped portion 302A in the circumferential direction around the X direction. The first drawn portion 304*a*A and the second drawn portion 304*b*A are bonded to each other by thermal bonding, for example. In this way, when viewed from the front, a lateral sealing portion 530A is formed. The drawn portion 304A is folded along an upper surface of the battery element 100A. However, the drawn portion 304A may not be folded. A shape of the fold of the drawn portion 304**A is not limited to the shape according to the first embodiment.

As illustrated in FIG. 4, a front notch 212A is provided in a right side surface of the front lid member 210A. The positive electrode tab 110A is drawn from the front lid member 210A to the front through the front notch 212A. The positive electrode tab 110A and the front lid member 210A are bonded to each other by a front bonding member 410A. The front bonding member 410A is provided in an entire circumference around the X direction of a portion of the positive electrode tab 110A passing through the front notch 212A. In the first embodiment, the front bonding member 410A is modified polypropylene (PP). When the front bonding member 410A is modified PP, the positive electrode tab 110A and the front lid member 210A can be bonded to each other even if the positive electrode tab 110A is metal and the front lid member 210A is resin. However, a material of the front bonding member 410A is not limited to modified PP.

In the first embodiment, the positive electrode tab 110A and the front lid member 210A can be easily fixed to each other by the front bonding member 410A. Furthermore, a gap between an outer circumferential surface of the positive electrode tab 110A around the X direction and an inner circumferential surface of the front notch 212A around the X direction can be filled with the front bonding member 410A. Moisture and gas can be therefore less likely to permeate through the gap between the outer circumferential surface of the positive electrode tab 110A around the X direction and the inner circumferential surface of the front notch 212A around the X direction than when the front bonding member 410A is not provided. The sealing property of the battery cell 10A can be thus improved as compared to when the front bonding member 410A is not provided.

A position in which the front notch 212A is provided is not limited to the example illustrated in FIG. 4. The front notch 212A may be provided in, for example, a left side surface of the front lid member 210A. Similarly to the positive electrode tab 110A and the front lid member 210A, the negative electrode tab 120A and the rear lid member 220A may also be bonded to each other by a rear bonding member similar to the front bonding member 410A.

Figure 5:
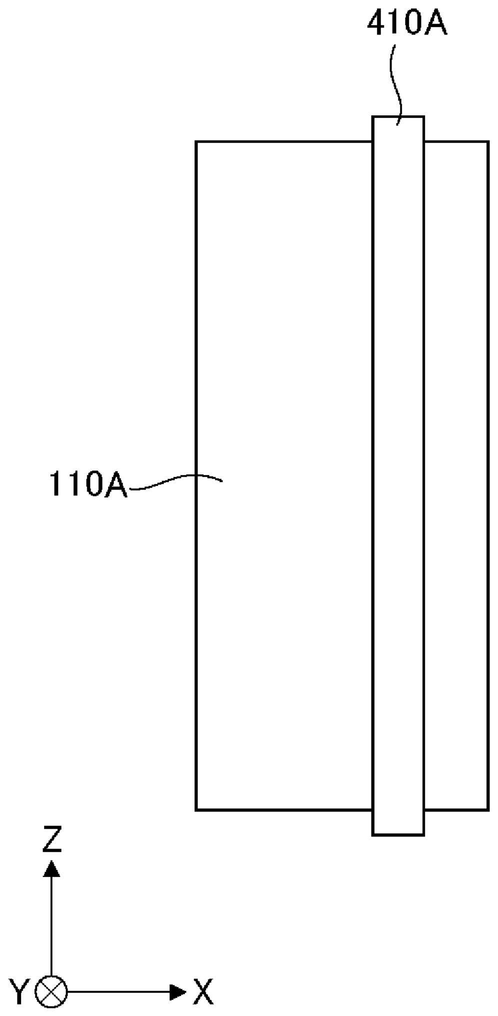
FIG. 5 is a diagram illustrating one example of a method of manufacturing a battery cell according to the first embodiment.
Figure 6:
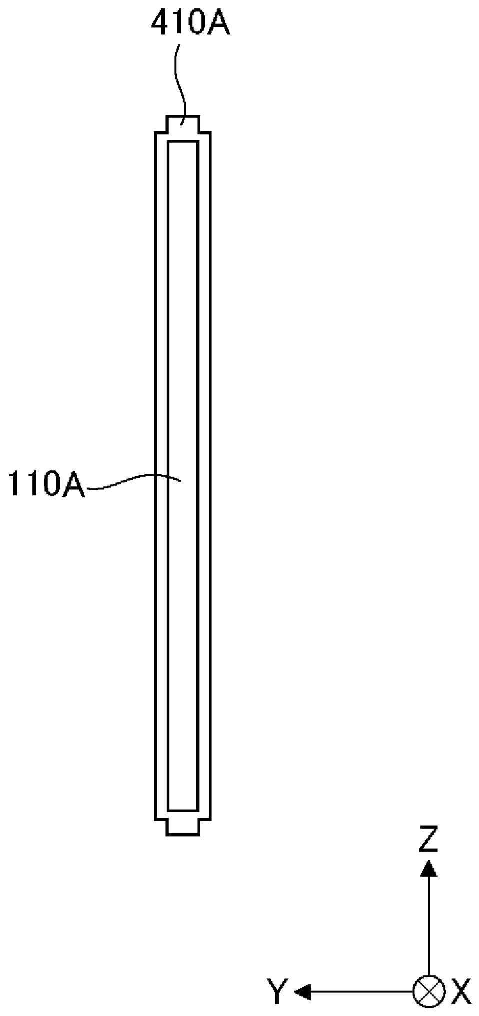
FIG. 6 is a diagram illustrating one example of the method of manufacturing a battery cell according to the first embodiment.
Figure 7:
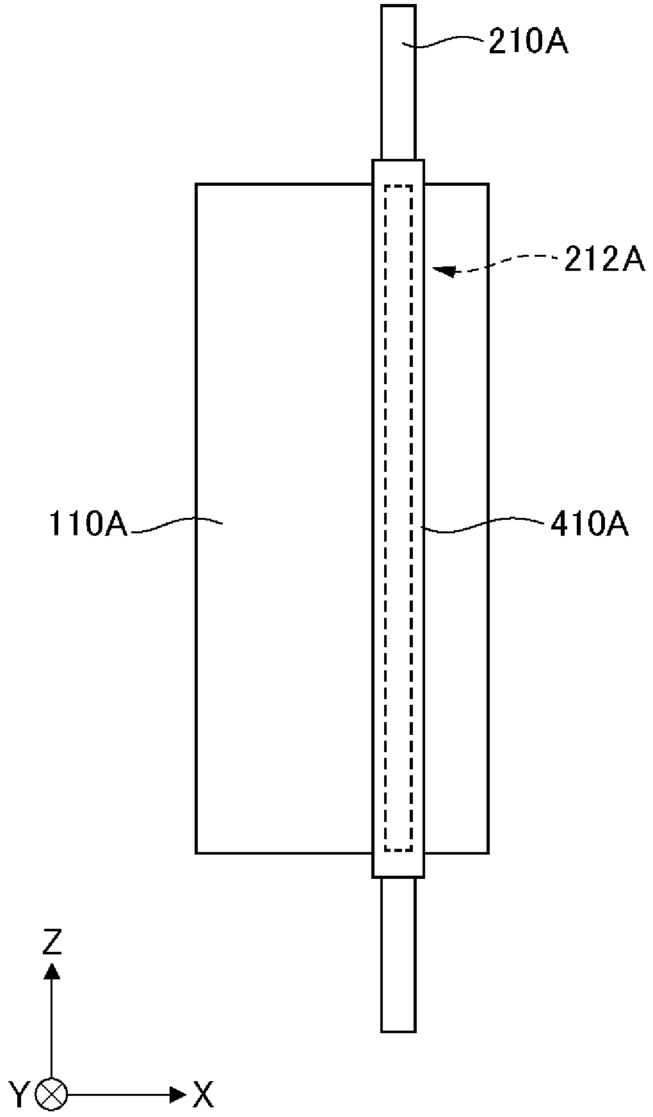
FIG. 7 is a diagram illustrating one example of the method of manufacturing a battery cell according to the first embodiment.

FIGS. 5 to 7 are diagrams illustrating one example of a method of manufacturing the battery cell 10A according to the first embodiment. In this example, the battery cell 10A is manufactured as follows.

First, the battery element 100A is manufactured. The battery element 100A includes at least one positive electrode, at least one negative electrode, and at least one separator.

Next, as illustrated in FIGS. 5 and 6, the front bonding member 410A is provided on the positive electrode tab 110A. The front bonding member 410A is provided in an entire circumference around the X direction of a portion of the positive electrode tab 110A passing through the front notch 212A in a subsequent step.

Next, as illustrated in FIG. 7, the portion of the positive electrode tab 110A covered by the front bonding member 410A overlaps the front notch 212A of the front lid member 210A in the Y direction. In this way, the positive electrode tab 110A and the front lid member 210A are bonded to each other via the front bonding member 410A.

Next, the positive electrode tab 110A and the positive electrode current collector **102*a*A** are bonded to each other.

The negative electrode tab 120A and the rear lid member 220A are also bonded to each other by a bonding method similar to the bonding method of the positive electrode tab 110A and the front lid member 210A. Next, the negative electrode tab 120A and the negative electrode current collector **104*a*A** are bonded to each other.

In the example described above, after the positive electrode tab 110A and the front lid member 210A are bonded to each other, the positive electrode tab 110A and the positive electrode current collector **102*a*A are bonded each other. However, after the positive electrode tab 110A and the positive electrode current collector 102*a*A are bonded to each other, the positive electrode tab 110A and the front lid member 210A may be bonded to each other. Similarly, in the example described above, after the negative electrode tab 120A and the rear lid member 220A are bonded to each other, the negative electrode tab 120A and the negative electrode current collector 104*a*A are bonded each other. However, after the negative electrode tab 120A and the negative electrode current collector 104*a*A are bonded to each other, the negative electrode tab 120A and the rear lid member 220**A may be bonded to each other.

Next, the exterior film 300A is wrapped one revolution around the X direction of the battery element 100A, the front lid member 210A, and the rear lid member 220A. In this way, the wrapped portion 302A is formed. An extra length of the exterior film 300A is drawn as the drawn portion 304A.

Next, the outer circumferential surface of the front lid member 210A around the X direction and the inner circumferential surface of the front opening of the wrapped portion 302A around the X direction are bonded to each other by thermal bonding. In this way, the front sealing portion 510A is formed. Next, the outer circumferential surface of the rear lid member 220A around the X direction and the inner circumferential surface of the rear opening of the wrapped portion 302A around the X direction are bonded to each other by thermal bonding. In this way, the rear sealing portion 520A is formed.

Next, an electrolytic solution is injected into the housing space 500A via a gap between the first drawn portion **304*a*A** and the second drawn portion 304*b*A. Next, the vacuum is drawn from the housing space 500A via the gap between the first drawn portion 304*a*A and the second drawn portion 304*b*A. Next, the lateral sealing portion 530A is formed by bonding the first drawn portion 304*a*A and the second drawn portion 304*b*A by thermal bonding. In this way, the housing space 500A is vacuum-sealed.

A method of vacuum-sealing the housing space 500A is not limited to the above-described example. In another example, first, the lateral sealing portion 530A is formed by bonding the first drawn portion 304*a*A and the second drawn portion 304*b*A by thermal bonding. Next, an electrolytic solution is injected into the housing space 500A via a solution injection hole provided in at least one of the front lid member 210A and the rear lid member 220A. Next, the vacuum is drawn from the housing space 500A via the solution injection hole. Next, the solution injection hole is covered by a predetermined lid member.

Next, the lateral sealing portion 530A is folded along the upper surface of the battery element 100A.

In this way, the battery cell 10A is manufactured.

Figure 8:
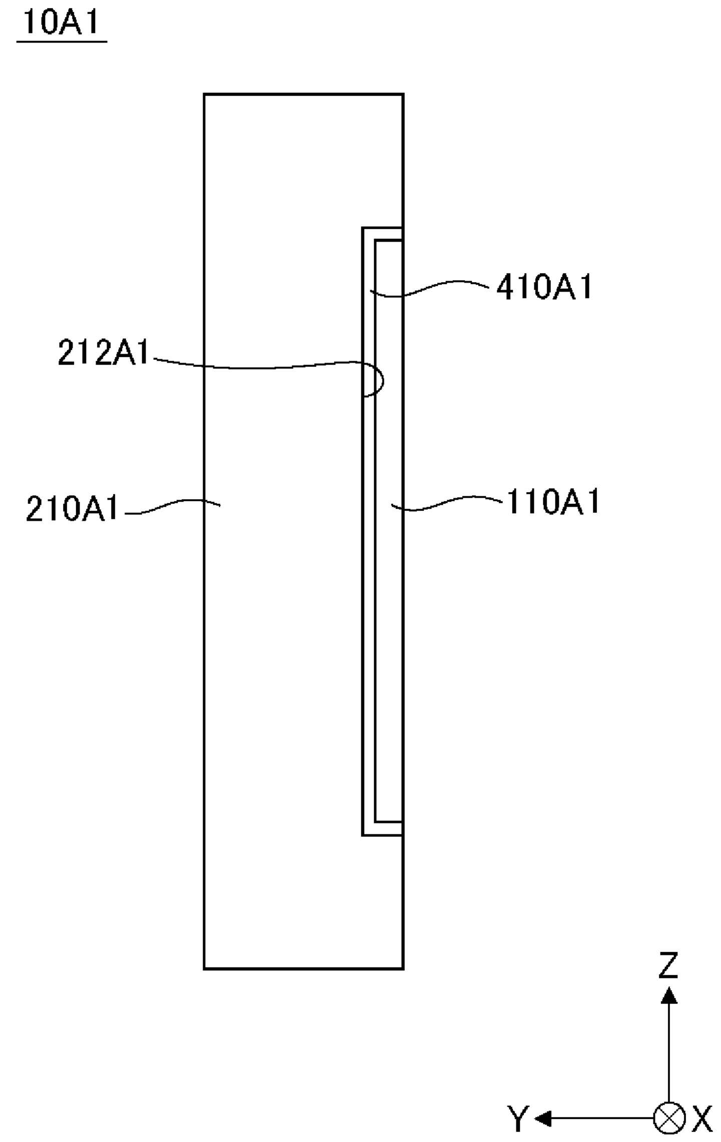
FIG. 8 is a front view of a battery cell according to a first variant.

FIG. 8 is a front view of a battery cell 10A1 according to a first variant. The battery cell 10A1 according to the first variant is similar to the battery cell 10A according to the first embodiment except for the following points. FIG. 8 does not illustrate the exterior film.

In the first variant, similarly to the first embodiment, a front notch 212A1 is provided in a right side surface of a front lid member 210A1. A positive electrode tab 110A1 is drawn from the front lid member 210A1 to the front through the front notch 212A1. The positive electrode tab 110A1 and the front lid member 210A1 are bonded to each other via a front bonding member 410A1. The front bonding member 410A1 is provided on an inner circumferential surface of the front notch 212A1 around the X direction, and a portion of an outer circumferential surface of the positive electrode tab 110A1 around the X direction facing the inner circumferential surface of the front notch 212A1.

Also in the first variant, similarly to the first embodiment, the positive electrode tab 110A1 and the front lid member 210A1 can be easily fixed to each other by the front bonding member 410A1. Furthermore, moisture and gas can be less likely to permeate through a gap between the outer circumferential surface of the positive electrode tab 110A1 around the X direction and the inner circumferential surface of the front notch 212A1 around the X direction than when the front bonding member 410A1 is not provided. The sealing property of the battery cell 10A1 can be thus improved as compared to when the front bonding member 410A1 is not provided.

In the first variant, at least a part of a surface of the positive electrode tab 110A1 exposed from the front notch 212A1 is not covered by the front bonding member 410A1. In the example illustrated in FIG. 8, a right side surface of the positive electrode tab 110A1 is not covered by the front bonding member 410A1. The amount of the front bonding member 410A1 can be therefore less in the first variant than in the first embodiment. Thus, permeation of moisture and gas through the front bonding member 410A1 can be easily suppressed.

In the first variant, the positive electrode tab 110A1 and the front lid member 210A1 are bonded to each other as follows, for example. First, the front bonding member 410A1 is provided on an inner circumferential surface of the front lid member 210A1 around the X direction of the front notch 212A1. Next, the positive electrode tab 110A1 overlaps the front notch 212A1 in the Y direction. In this way, the positive electrode tab 110A1 and the front lid member 210A1 are bonded to each other via the front bonding member 410A1. In this case, at least a part of a surface of the positive electrode tab 110A1 exposed from the front notch 212A1 is not covered by the front bonding member 410A1. However, a part of the front bonding member 410A1 leaking from the gap between the outer circumferential surface of the positive electrode tab 110A1 around the X direction and the inner circumferential surface of the front notch 212A1 around the X direction may cover a part of the surface of the positive electrode tab 110A1 exposed from the front notch 212A1.

In the first variant, bonding between the positive electrode tab 110A1 and the front lid member 210A1 is described. However, the matter described in the first variant can also be similarly applied to bonding between a negative electrode tab and a rear lid member.

Figure 9:
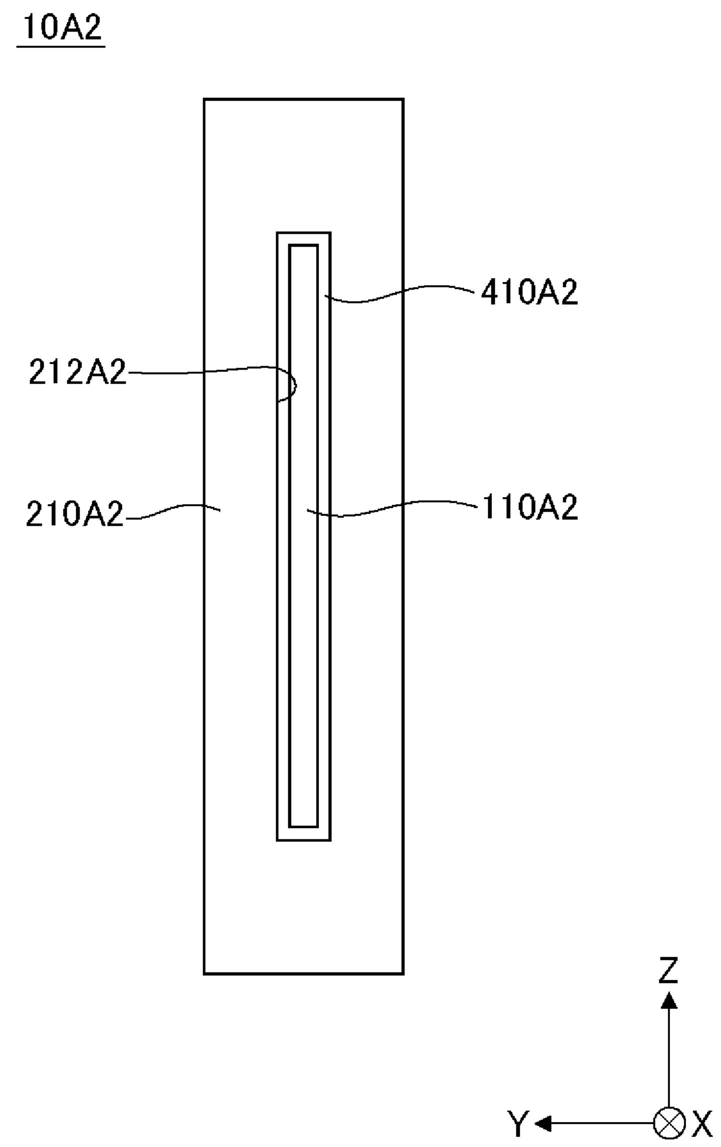
FIG. 9 is a front view of a battery cell according to a second variant.

FIG. 9 is a front view of a battery cell 10A2 according to a second variant. The battery cell according to the second variant is similar to the battery cell 10A according to the first embodiment except for the following points. FIG. 9 does not illustrate the exterior film.

In the second variant, when viewed from the X direction, a front hole 212A2 is provided approximately in the center of a front lid member 210A2. A positive electrode tab 110A2 is drawn to the front of the front lid member 210A2 through the front hole 212A2. The positive electrode tab 110A2 and the front lid member 210A2 are bonded to each other via a front bonding member 410A2. The front bonding member 410A2 is provided between an outer circumferential surface of the positive electrode tab 110A2 around the X direction and an inner circumferential surface of the front hole 212A2 around the X direction.

Also in the second variant, similarly to the first embodiment, the positive electrode tab 110A2 and the front lid member 210A2 can be easily fixed to each other by the front bonding member 410A2. Furthermore, moisture and gas can be less likely to permeate through a gap between the outer circumferential surface of the positive electrode tab 110A2 around the X direction and the inner circumferential surface of the front hole 212A2 around the X direction than when the front bonding member 410A2 is not provided. The sealing property of the battery cell 10A2 can be thus improved as compared to when the front bonding member 410A2 is not provided.

In the second variant, the positive electrode tab 110A2 and the front lid member 210A2 are bonded to each other as follows, for example. First, the positive electrode tab 110A2 passes through the front hole 212A2. Next, the front bonding member 410A2 is injected into the gap between the outer circumferential surface of the positive electrode tab 110A2 around the X direction and the inner circumferential surface of the front hole 212A2 around the X direction. In this way, the positive electrode tab 110A2 and the front lid member 210A2 are bonded to each other via the front bonding member 410A2.

In the second variant, bonding between the positive electrode tab 110A2 and the front lid member 210A2 is described. However, the matter described in the second variant can also be similarly applied to bonding between a negative electrode tab and a rear lid member.

While the first embodiment and the variants of the present invention have been described with reference to the drawings, the embodiment and the variants are only exemplification of the present invention, and various configurations other than the above may be employed.

For example, in the first embodiment, the positive electrode tab 110A and the negative electrode tab 120A are disposed on opposite sides to each other in the X direction of the battery element 100A. However, both of the positive electrode tab 110A and the negative electrode tab 120A may be disposed on only one of a front side and a rear side in the X direction of the battery element 100A. Also in this case, two lid members cover the front end portion and the rear end portion of the battery element 100A.

Second Embodiment

Hereinafter, a second embodiment and variant of the present invention will be described by using drawings. In all of the drawings, a similar component has a similar reference sign, and description thereof will be appropriately omitted.

Figure 10:
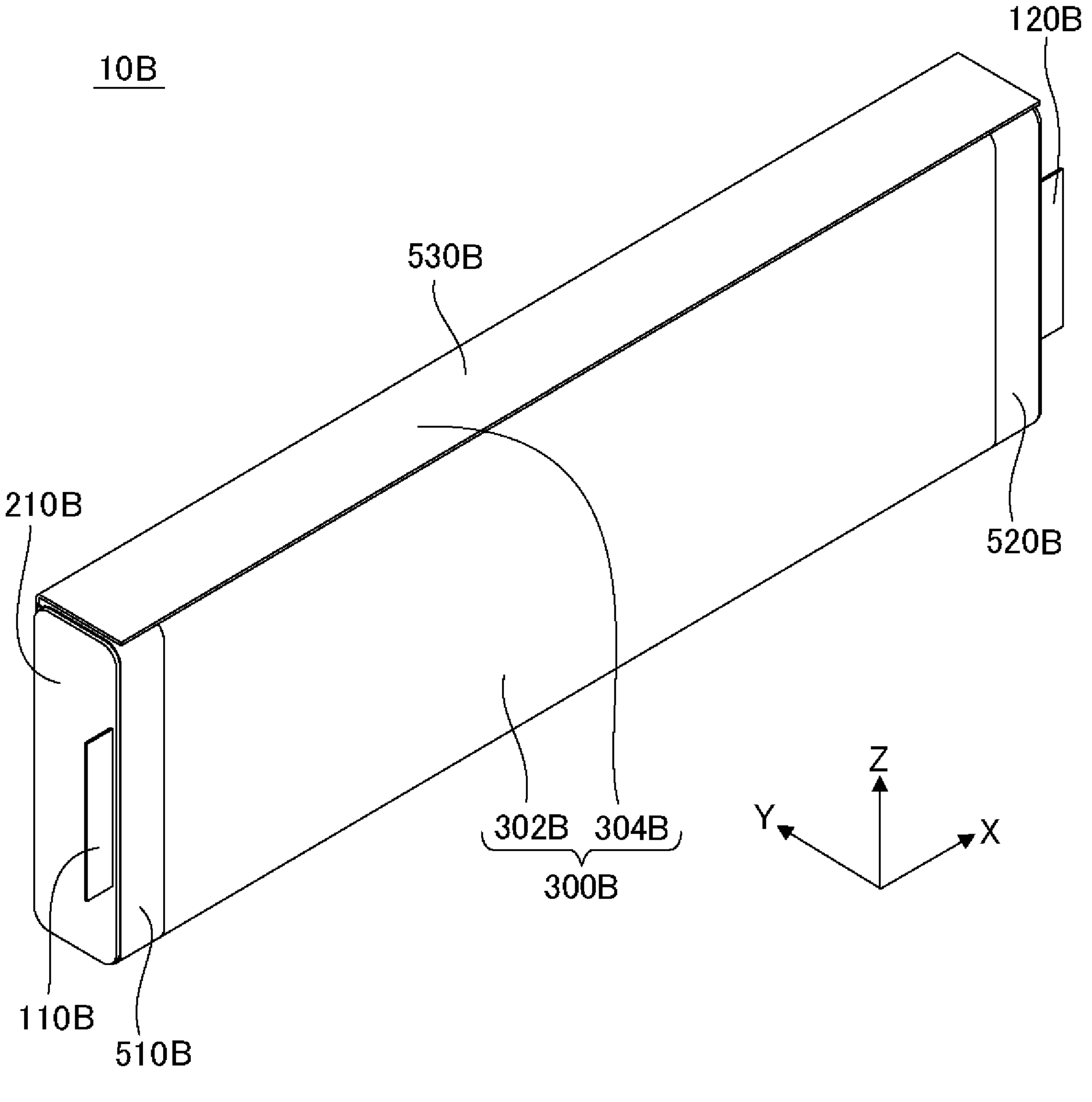
FIG. 10 is a front perspective view of a battery cell according to a second embodiment.
Figure 11:
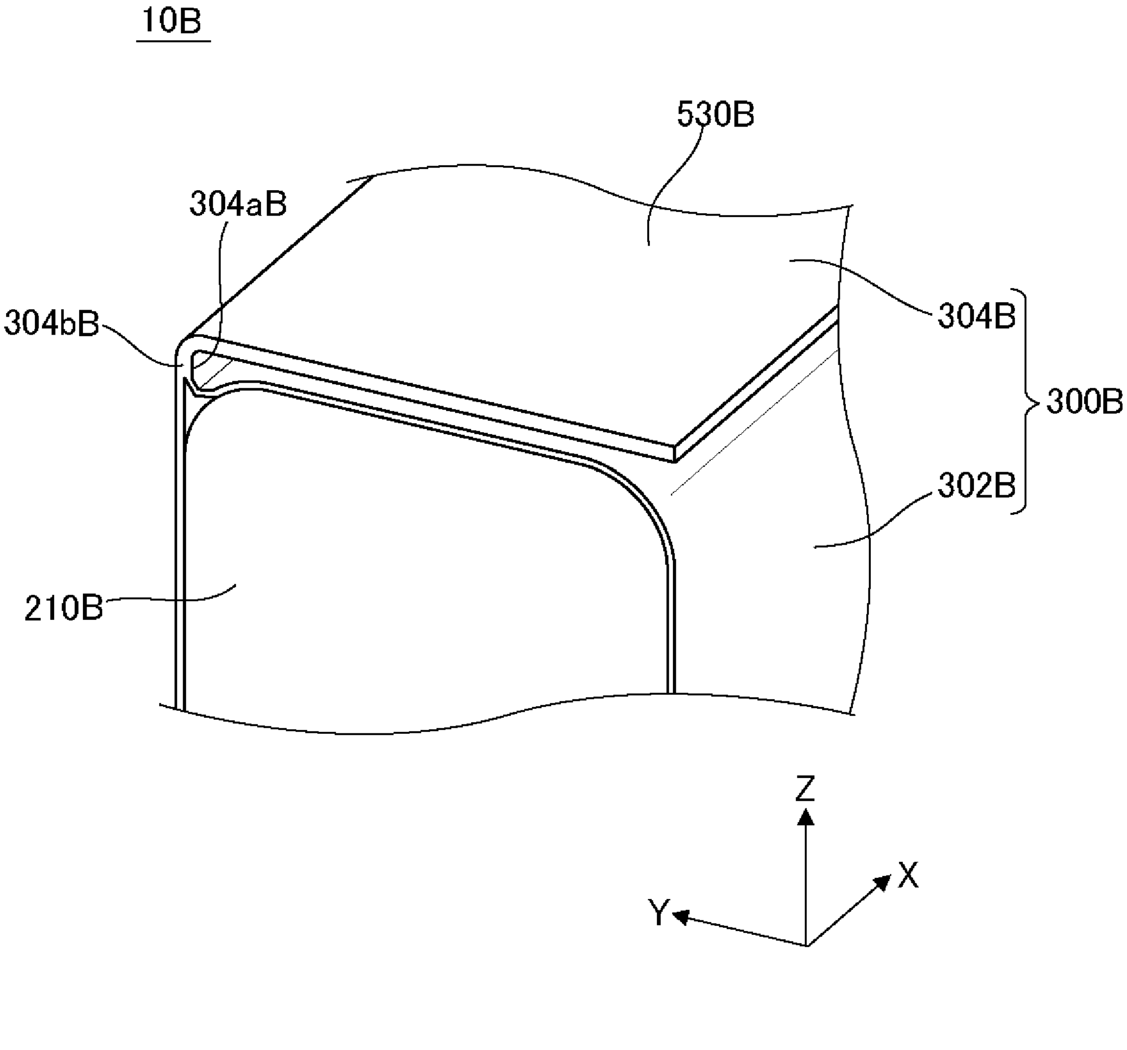
FIG. 11 is a front enlarged perspective view of a part of the battery cell according to the second embodiment.
Figure 12:
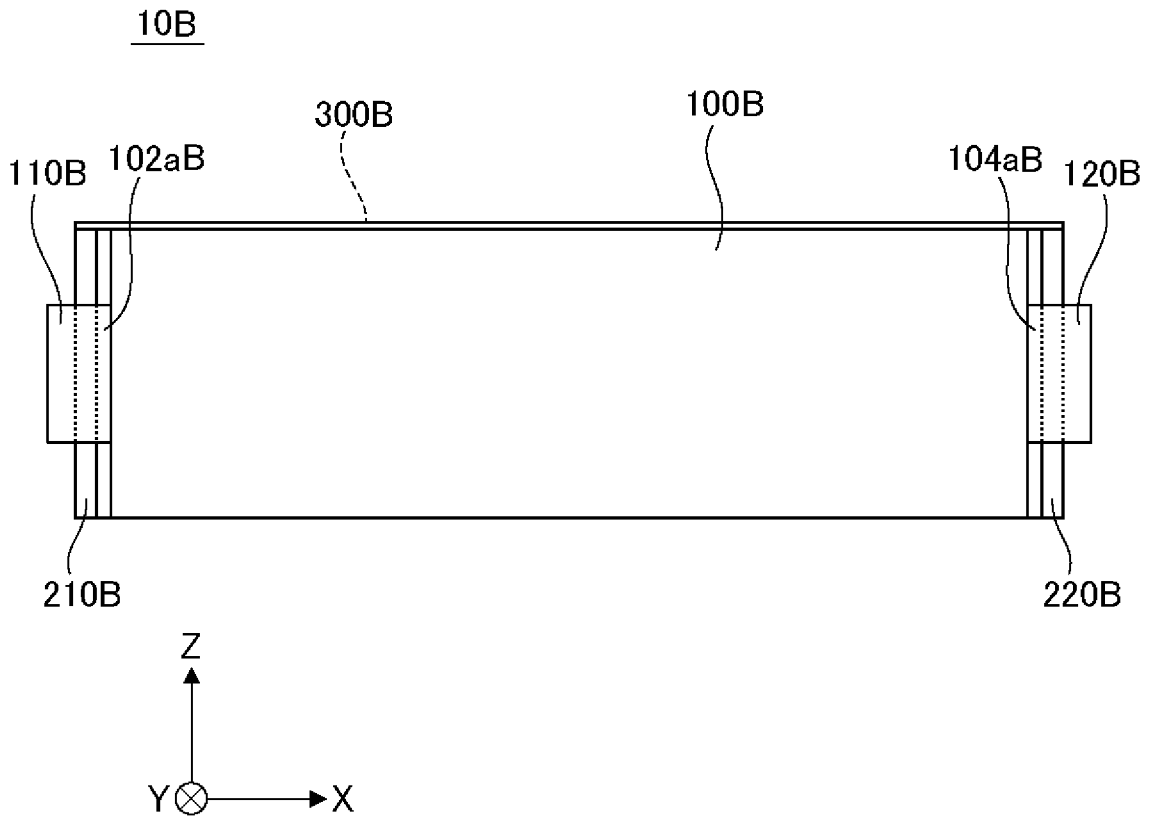
FIG. 12 is a right side view of the battery cell according to the second embodiment.
Figure 13:
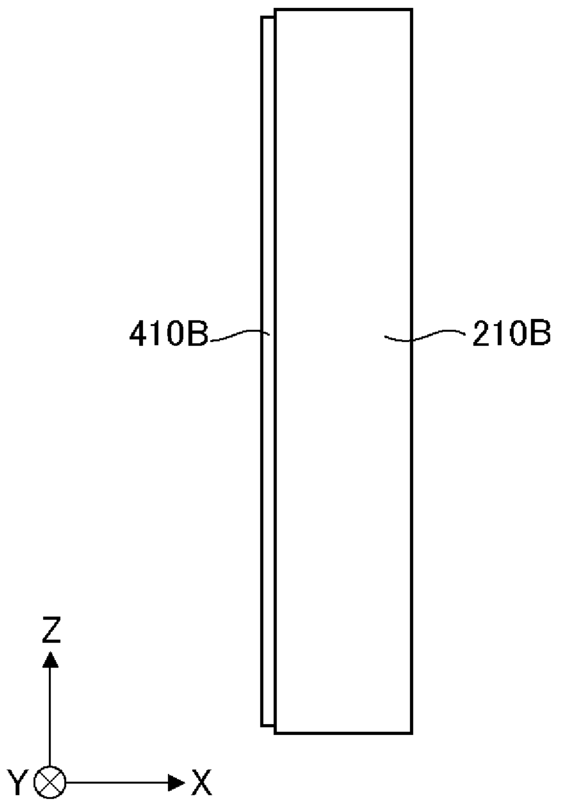
FIG. 13 is a right side view of a front lid member according to the second embodiment.

FIG. 10 is a front perspective view of a battery cell 10B according to the second embodiment. FIG. 11 is a front enlarged perspective view of a part of the battery cell 10B according to the second embodiment. FIG. 12 is a right side view of the battery cell 10B according to the second embodiment. FIG. 13 is a right side view of a front lid member 210B according to the second embodiment. In FIG. 12, an exterior film 300B is illustrated to be transparent for description.

In each drawing, an X direction, a Y direction, and a Z direction are provided for description. The X direction indicates a front-rear direction of the battery cell 10B. The Y direction is orthogonal to the X direction. The Y direction indicates a left-right direction of the battery cell 10B. The Z direction is orthogonal to both of the X direction and the Y direction. The Z direction indicates an up-down direction of the battery cell 10B. A direction pointed by an arrow indicating the X direction, a direction pointed by an arrow indicating the Y direction, and a direction pointed by an arrow indicating the Z direction are a rear direction, a left direction, and an upward direction, respectively. However, a relationship among the X direction, the Y direction, the Z direction, the front-rear direction, the left-right direction, and the up-down direction of the battery cell 10B is not limited to this example.

A white circle with an X indicating the X direction, the Y direction, or the Z direction indicates that a direction from the front to the back of the paper plane is a direction pointed by an arrow indicating the direction.

The battery cell 10B includes a battery element 100B, a positive electrode tab 110B, a negative electrode tab 120B, the front lid member 210B, a rear lid member 220B, and the exterior film 300B. The exterior film 300B includes a wrapped portion 302B and a drawn portion 304B.

The battery element 100B has an approximate rectangular cuboid shape. A longitudinal direction of the battery element 100B is substantially parallel to the X direction. A length of the battery element 100B in the X direction may be, for example, but is not limited to, equal to or more than 300 mm and equal to or less than 500 mm, preferably, equal to or less than 450 mm. A transverse direction of the battery element 100B is substantially parallel to the Z direction. A length of the battery element 100B in the Z direction may be, for example, but is not limited to, equal to or more than 90 mm and equal to or less than 130 mm, preferably, equal to or less than 120 mm. A thickness direction of the battery element 100B is substantially parallel to the Y direction. A thickness of the battery element 100B in the Y direction may be, for example, but is not limited to, equal to or more than 20 mm and equal to or less than 50 mm, preferably, equal to or less than 45 mm. However, a shape of the battery element 100B is not limited to this example.

The battery element 100B includes at least one unillustrated positive electrode, at least one unillustrated negative electrode, and at least one unillustrated separator. For example, a plurality of the positive electrodes and a plurality of the negative electrodes are alternately stacked in the Y direction. At least a part of the separator is located between the positive electrode and the negative electrode adjacent to each other in the Y direction. For example, each of a plurality of sheet-shaped separators may be located between the positive electrode and the negative electrode adjacent to each other in the Y direction. Alternatively, one sheet-shaped separator may have a fanfold shape through a region between the positive electrode and the negative electrode adjacent to each other in the Y direction. Alternatively, the positive electrode, the negative electrode, and the separator may be wound with the separator located between the positive electrode and the negative electrode. In one example, the positive electrode, the negative electrode, and the separator are wound with both sides of one of the positive electrode and the negative electrode covered by the separator. In another example, a stacked body including a plurality of unit stacked bodies including the positive electrode, the separator, and the negative electrode in this order may be wound. However, a winding structure of the positive electrode, the negative electrode, and the separator is not limited to these examples.

As illustrated in FIG. 12, the positive electrode tab 110B is disposed on the front of the battery element 100B. A rear end portion of the positive electrode tab 110B is electrically connected to a positive electrode current collector 102*a*B. The positive electrode current collector 102*a*B is drawn from the positive electrode to the front. In this way, the positive electrode tab 110B is electrically connected to the plurality of positive electrodes.

As illustrated in FIG. 12, the negative electrode tab 120B is disposed on the rear of the battery element 100B. A front end portion of the negative electrode tab 120B is electrically connected to a negative electrode current collector 104*a*B. The negative electrode current collector 104*a*B is drawn from the negative electrode to the rear. In this way, the negative electrode tab 120B is electrically connected to the plurality of negative electrodes.

The front lid member 210B covers a front end portion of the battery element 100B. The front lid member 210B is formed of, for example, resin such as polypropylene. A front end portion of the positive electrode tab 110B is drawn from a front surface of the front lid member 210B toward the front. When viewed from the front, the front lid member 210B has a substantially rectangular shape. When viewed from the front, a longitudinal direction of the front lid member 210B is substantially parallel to the Z direction, and a transverse direction of the front lid member 210B is substantially parallel to the Y direction.

The rear lid member 220B covers a rear end portion of the battery element 100B. The rear lid member 220B is formed of, for example, resin such as polypropylene. A rear end portion of the negative electrode tab 120B is drawn from a rear surface of the rear lid member 220B toward the rear. When viewed from the rear, the rear lid member 220B has a substantially rectangular shape. When viewed from the rear, a longitudinal direction of the rear lid member 220B is substantially parallel to the Z direction, and a transverse direction of the rear lid member 220B is substantially parallel to the Y direction.

As illustrated in FIGS. 10 and 11, the wrapped portion 302B has a substantially tubular shape open toward both of the front and the rear. The front lid member 210B is disposed inside the front opening of the wrapped portion 302B. The rear lid member 220B is disposed inside the rear opening of the wrapped portion 302B. The wrapped portion 302B is wrapped one revolution around the X direction of the battery element 100B, the front lid member 210B, and the rear lid member 220B. In this way, the front lid member 210B, the rear lid member 220B, and the wrapped portion 302B form a housing space 500B that houses the battery element 100B. An unillustrated electrolytic solution is housed together with the battery element 100B in the housing space 500B. A state of wrapping of the wrapped portion 302B around the battery element 100B is not limited to the example described above.

In the examples illustrated in FIGS. 10 and 11, at least a part of the front lid member 210B around the positive electrode tab 110B is exposed from the exterior film 300B. However, the exterior film 300B may cover the front surface of the front lid member 210B. Similarly, at least a part of the rear lid member 220B around the negative electrode tab 120B is exposed from the exterior film 300B. However, the exterior film 300B may cover the rear surface of the rear lid member 220B.

An outer circumferential surface of the front lid member 210B around the X direction and an inner circumferential surface of the front opening of the wrapped portion 302B around the X direction are bonded to each other by thermal bonding, for example. In this way, a front sealing portion 510B is formed.

An outer circumferential surface of the rear lid member 220B around the X direction and an inner circumferential surface of the rear opening of the wrapped portion 302B around the X direction are bonded to each other by thermal bonding, for example. In this way, a rear sealing portion 520B is formed.

As illustrated in FIGS. 10 and 11, when viewed from the front, the drawn portion 304B is drawn from a corner of the wrapped portion 302B on an upper left side of the battery element 100B. Specifically, as illustrated in FIG. 11, the drawn portion 304B includes a first drawn portion 304*a*B and a second drawn portion 304*b*B. The first drawn portion 304*a*B is drawn from one of both ends of the wrapped portion 302B in a circumferential direction around the X direction. The second drawn portion 304*b*B is drawn from the other of both ends of the wrapped portion 302B in the circumferential direction around the X direction. The first drawn portion 304*a*B and the second drawn portion 304*b*B are bonded to each other by thermal bonding, for example. In this way, when viewed from the front, a lateral sealing portion 530B is formed. The drawn portion 304B is folded along an upper surface of the battery element 100B. However, the drawn portion 304B may not be folded. A shape of the fold of the drawn portion 304B is not limited to the shape according to the second embodiment.

As illustrated in FIG. 13, a front barrier member 410B is provided on the front surface of the front lid member 210B. The front barrier member 410B is separate from the exterior film 300B. The barrier member can be thus more easily provided on the front surface of the front lid member 210B in the example illustrated in FIG. 13 than when a front end portion of the exterior film 300B serves as a barrier member and covers at least a part of the front surface of the front lid member 210B. The front barrier member 410B is formed of a material having lower moisture permeability and gas permeability than those of a material constituting the front lid member 210B. For example, the front barrier member 410B is formed of metal. In the example illustrated in FIG. 13, the front barrier member 410B can be, for example, a metal sheet attached to the front surface of the front lid member 210B. In the second embodiment, even if moisture permeability or gas permeability of the front lid member 210B is relatively high, the front barrier member 410B can suppress permeation of moisture and gas. The sealing property of the battery cell 10B can be therefore improved as compared to when the front barrier member 410B is not provided.

From a viewpoint of suppressing permeation of moisture and gas by the front barrier member 410B, an area of the front barrier member 410B when viewed from the X direction is preferably relatively great. For example, when viewed from the X direction, the front barrier member 410B may be provided in an area equal to or more than 85%, preferably equal to or more than 90%, more preferably equal to or more than 92% of an entire area of the front lid member 210B. For example, when viewed from the X direction, the front barrier member 410B may be entirely provided in the entire area of the front lid member 210B.

A position in which the front barrier member 410B is provided is not limited to the example illustrated in FIG. 13. The front barrier member 410B may be provided on, for example, a rear surface of the front lid member 210B.

In FIG. 13, the structure of the front lid member 210B is described. However, similarly to the front lid member 210B, a rear barrier member similar to the front barrier member 410B may also be provided on the rear lid member 220B.

Next, one example of a method of manufacturing the battery cell 10B according to the second embodiment will be described. In this example, the battery cell 10B is manufactured as follows.

First, the battery element 100B is manufactured. The battery element 100B includes at least one positive electrode, at least one negative electrode, and at least one separator.

Next, the positive electrode tab 110B and the front lid member 210B are bonded to each other. The front barrier member 410B is provided on the front lid member 210B. Similarly, the negative electrode tab 120B and the rear lid member 220B are bonded to each other. The rear barrier member similar to the front barrier member 410B is provided on the rear lid member 220B. Next, the positive electrode tab 110B and the positive electrode current collector 102*a*B are bonded to each other. Similarly, the negative electrode tab 120B and the negative electrode current collector 104*a*B are bonded to each other. However, after the positive electrode tab 110B and the positive electrode current collector 102*a*B are bonded to each other, the positive electrode tab 110B and the front lid member 210B may be bonded to each other. Similarly, after the negative electrode tab 120B and the negative electrode current collector 104*a*B are bonded to each other, the negative electrode tab 120B and the rear lid member 220B may be bonded to each other.

Next, the exterior film 300B is wrapped one revolution around the X direction of the battery element 100B, the front lid member 210B, and the rear lid member 220B. In this way, the wrapped portion 302B is formed. An extra length of the exterior film 300B is drawn as the drawn portion 304B.

Next, the outer circumferential surface of the front lid member 210B around the X direction and the inner circumferential surface of the front opening of the wrapped portion 302B around the X direction are bonded to each other by thermal bonding. In this way, the front sealing portion 510B is formed. Next, the outer circumferential surface of the rear lid member 220B around the X direction and the inner circumferential surface of the rear opening of the wrapped portion 302B around the X direction are bonded to each other by thermal bonding. In this way, the rear sealing portion 520B is formed.

Next, an electrolytic solution is injected into the housing space 500B via a gap between the first drawn portion 304aB and the second drawn portion 304bB. Next, the vacuum is drawn from the housing space 500B via the gap between the first drawn portion 304aB and the second drawn portion 304bB. Next, the lateral sealing portion 530B is formed by bonding the first drawn portion 304aB and the second drawn portion 304bB by thermal bonding. In this way, the housing space 500B is vacuum-sealed.

A method of vacuum-sealing the housing space 500B is not limited to the above-described example. In another example, first, the lateral sealing portion 530B is formed by bonding the first drawn portion 304aB and the second drawn portion 304bB by thermal bonding. Next, an electrolytic solution is injected into the housing space 500B via a solution injection hole provided in at least one of the front lid member 210B and the rear lid member 220B. Next, the vacuum is drawn from the housing space 500B via the solution injection hole. Next, the solution injection hole is covered by a predetermined lid member.

Next, the lateral sealing portion 530B is folded along the upper surface of the battery element 100B.

In this way, the battery cell 10B is manufactured.

Figure 14:
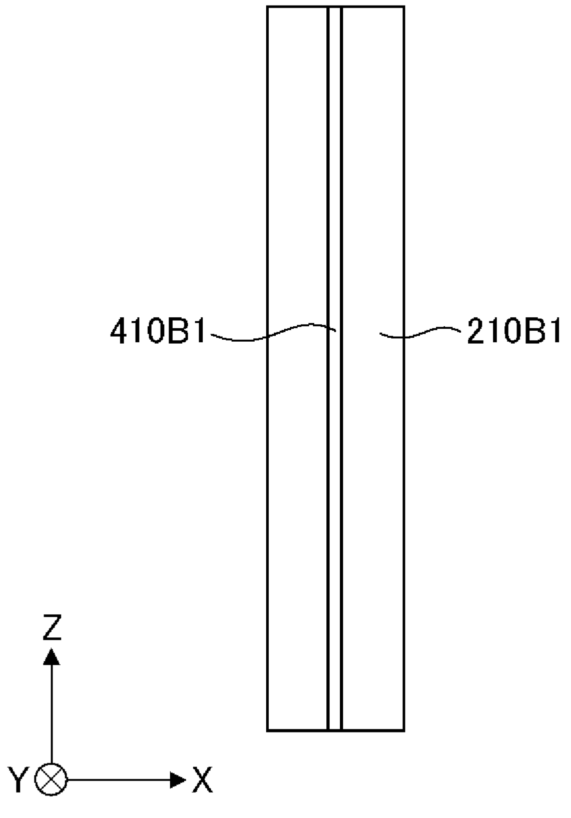
FIG. 14 is a right side view of a front lid member according to a variant.

FIG. 14 is a right side view of a front lid member 210B1 according to a variant. The front lid member 210B1 according to the variant is similar to the front lid member 210B according to the second embodiment except for the following points.

In the variant, a front barrier member 410B1 is provided on at least a part of an outer circumferential surface of the front lid member 210B1 around the X direction. In the example illustrated in FIG. 14, a slit is provided in an entire circumference around the X direction of the front lid member 210B1 approximately at the center in the X direction of the front lid member 210B1. The front barrier member 410B1 is embedded in the slit. Also in the variant, similarly to the second embodiment, even if moisture permeability or gas permeability of the front lid member 210B1 is relatively high, the front barrier member 410B1 can suppress permeation of moisture and gas. The sealing property of the battery cell can be therefore improved as compared to when the front barrier member 410B1 is not provided.

A position in which the front barrier member 410B1 is provided is not limited to the example illustrated in FIG. 14. The front barrier member 410B1 may be provided in a position offset forward or rearward approximately from the center in the X direction of the front lid member 210B1, for example.

In FIG. 14, the structure of the front lid member 210B1 is described. However, similarly to the front lid member 210B1, a rear barrier member similar to the front barrier member 410B1 may also be provided on a rear lid member.

While the second embodiment and the variant of the present invention have been described with reference to the drawings, the embodiment and the variant are only exemplification of the present invention, and various configurations other than the above may be employed.

For example, in the second embodiment, the positive electrode tab 110B and the negative electrode tab 120B are disposed on opposite sides to each other in the X direction of the battery element 100B. However, both of the positive electrode tab 110B and the negative electrode tab 120B may be disposed on only one of a front side and a rear side in the X direction of the battery element 100B. In this case, for example, two lid members cover the front end portion and the rear end portion of the battery element 100B. Alternatively, a lid member may cover only a side of the battery element 100B from which the positive electrode tab 110B and the negative electrode tab 120B are drawn. In this example, the exterior film 300B may be sealed and folded along the battery element 100B on an opposite side to the lid member of the battery element 100B.

Third Embodiment

Hereinafter, a third embodiment and variant of the present invention will be described by using drawings. In all of the drawings, a similar component has a similar reference sign, and description thereof will be appropriately omitted.

Figure 15:
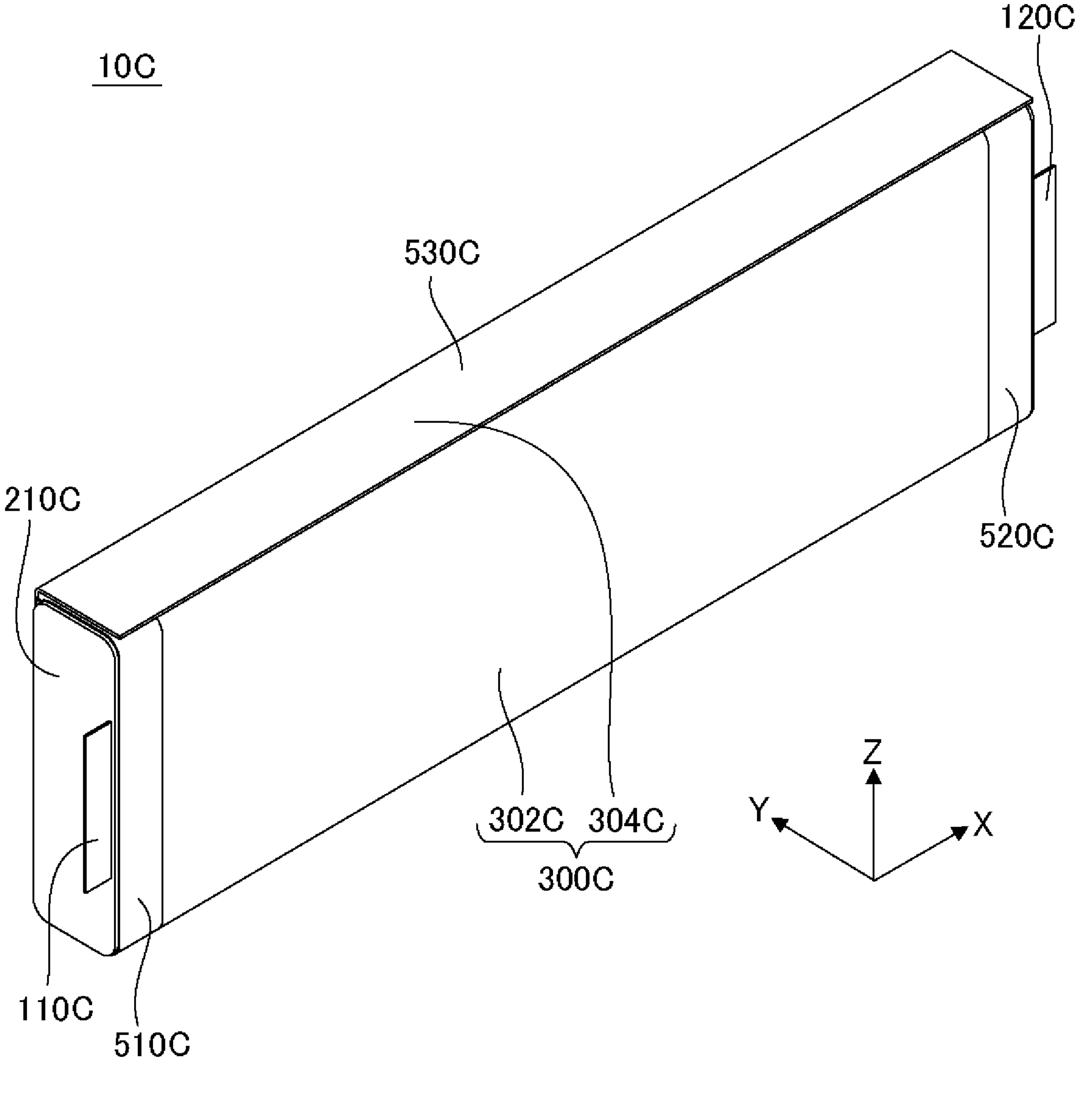
FIG. 15 is a front perspective view of a battery cell according to a third embodiment.
Figure 16:
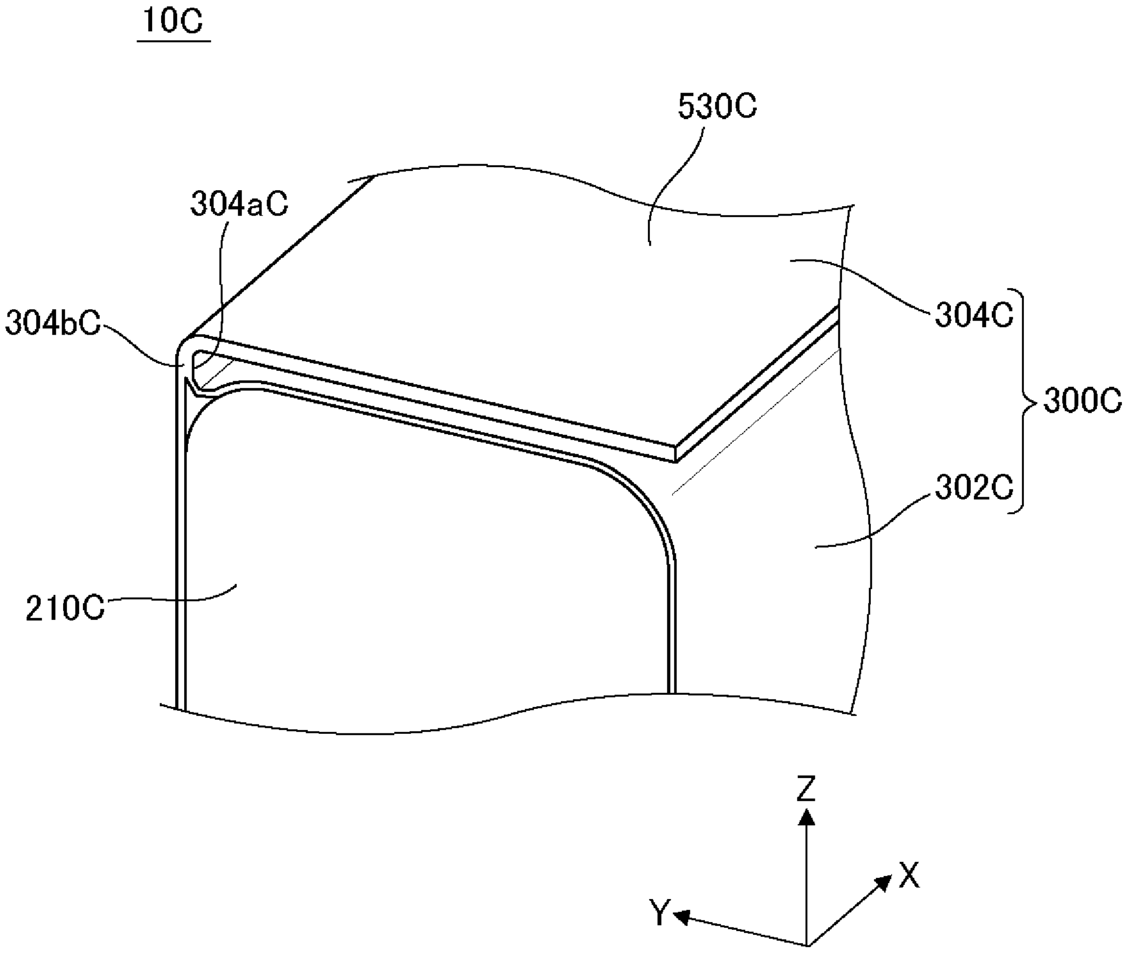
FIG. 16 is a front enlarged perspective view of a part of the battery cell according to the third embodiment.
Figure 17:
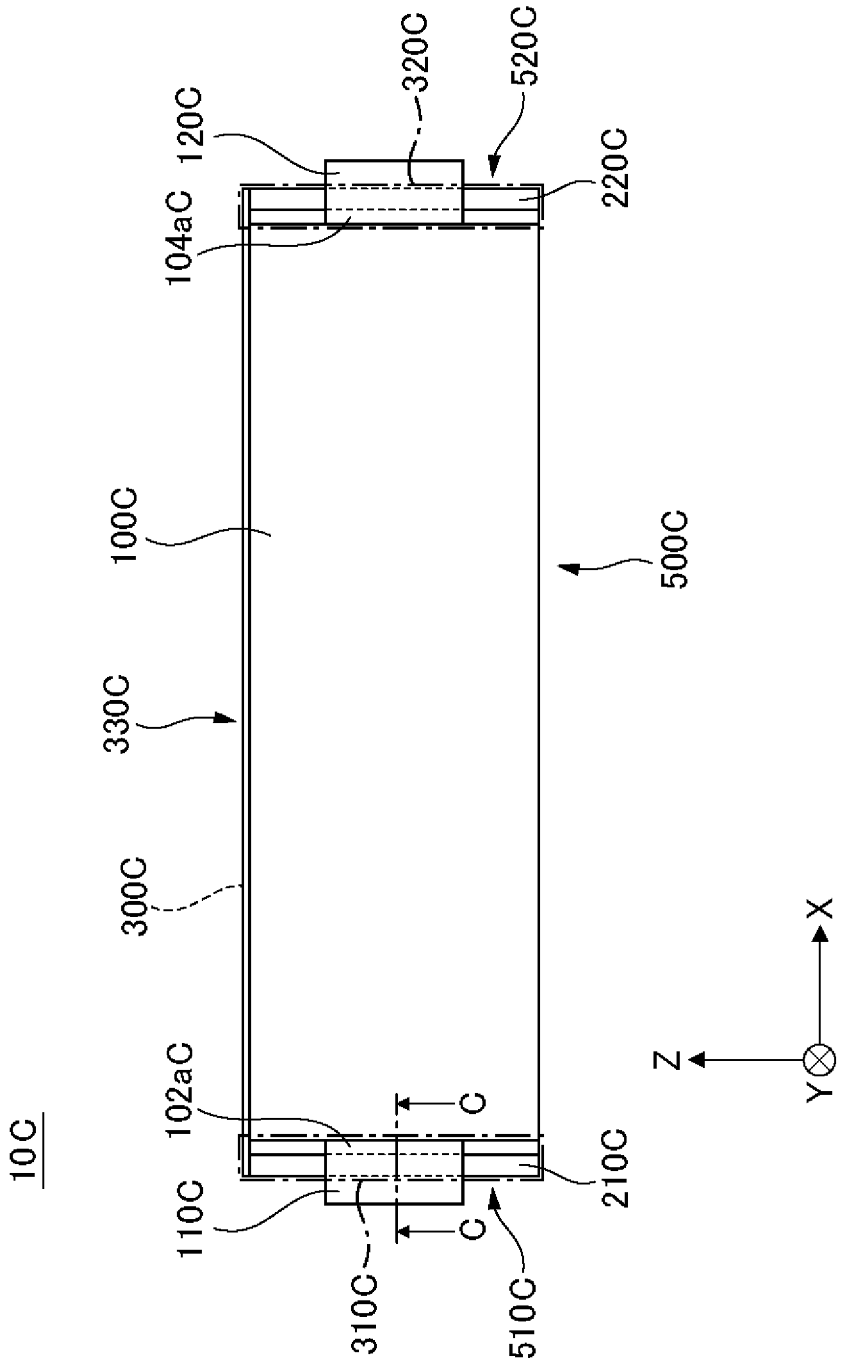
FIG. 17 is a right side view of the battery cell according to the third embodiment.
Figure 18:
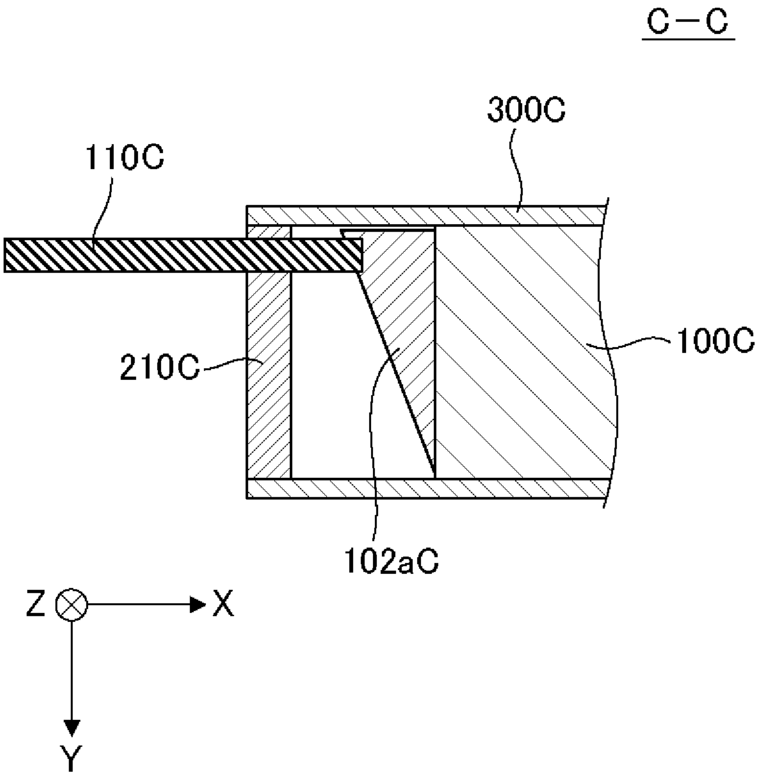
FIG. 18 is a schematic cross-sectional view taken along a C-C line in FIG. 17.

FIG. 15 is a front perspective view of a battery cell 10C according to the third embodiment. FIG. 16 is a front enlarged perspective view of a part of the battery cell 10C according to the third embodiment. FIG. 17 is a right side view of the battery cell 10C according to the third embodiment. FIG. 18 is a schematic cross-sectional view taken along a C-C line in FIG. 17. In FIG. 17, an exterior film 300C is illustrated to be transparent for description.

In each drawing, an X direction, a Y direction, and a Z direction are provided for description. The X direction indicates a front-rear direction of the battery cell 10C. The Y direction is orthogonal to the X direction. The Y direction indicates a left-right direction of the battery cell 10C. The Z direction is orthogonal to both of the X direction and the Y direction. The Z direction indicates an up-down direction of the battery cell 10C. A direction pointed by an arrow indicating the X direction, a direction pointed by an arrow indicating the Y direction, and a direction pointed by an arrow indicating the Z direction are a rear direction, a left direction, and an upward direction, respectively. However, a relationship among the X direction, the Y direction, the Z direction, the front-rear direction, the left-right direction, and the up-down direction of the battery cell 10C is not limited to this example.

A white circle with an X indicating the X direction, the Y direction, or the Z direction indicates that a direction from the front to the back of the paper plane is a direction pointed by an arrow indicating the direction.

The battery cell 10C includes a battery element 100C, a positive electrode tab 110C, a negative electrode tab 120C, a front lid member 210C, a rear lid member 220C, and the exterior film 300C. The exterior film 300C includes a wrapped portion 302C and a drawn portion 304C.

The battery element 100C has an approximate rectangular cuboid shape. A longitudinal direction of the battery element 100C is substantially parallel to the X direction. A length of the battery element 100C in the X direction may be, for example, but is not limited to, equal to or more than 300 mm and equal to or less than 500 mm, preferably, equal to or less than 450 mm. A transverse direction of the battery element 100C is substantially parallel to the Z direction. A length of the battery element 100C in the Z direction may be, for example, but is not limited to, equal to or more than 90 mm and equal to or less than 130 mm, preferably, equal to or less than 120 mm. A thickness direction of the battery element 100C is substantially parallel to the Y direction. A thickness of the battery element 100C in the Y direction may be, for example, but is not limited to, equal to or more than 20 mm and equal to or less than 50 mm, preferably, equal to or less than 45 mm. However, a shape of the battery element 100C is not limited to this example.

The battery element 100C includes at least one unillustrated positive electrode, at least one unillustrated negative electrode, and at least one unillustrated separator. For example, a plurality of the positive electrodes and a plurality of the negative electrodes are alternately stacked in the Y direction. At least a part of the separator is located between the positive electrode and the negative electrode adjacent to each other in the Y direction. For example, each of a plurality of sheet-shaped separators may be located between the positive electrode and the negative electrode adjacent to each other in the Y direction. Alternatively, one sheet-shaped separator may have a fanfold shape through a region between the positive electrode and the negative electrode adjacent to each other in the Y direction. Alternatively, the positive electrode, the negative electrode, and the separator may be wound with the separator located between the positive electrode and the negative electrode. In one example, the positive electrode, the negative electrode, and the separator are wound with both sides of one of the positive electrode and the negative electrode covered by the separator. In another example, a stacked body including a plurality of unit stacked bodies including the positive electrode, the separator, and the negative electrode in this order may be wound. However, a winding structure of the positive electrode, the negative electrode, and the separator is not limited to these examples.

As illustrated in FIG. 17, the positive electrode tab 110C is disposed on the front of the battery element 100C. A rear end portion of the positive electrode tab 110C is electrically connected to a positive electrode current collector 102*a*C. The positive electrode current collector 102*a*C is drawn from the positive electrode to the front. In this way, the positive electrode tab 110C is electrically connected to the plurality of positive electrodes. As illustrated in FIG. 18, a plurality of the positive electrode current collectors 102*a*C are collected between the battery element 100C and the front lid member 210C. In other words, a collection portion of the plurality of positive electrode current collectors 102*a*C is present between the battery element 100C and the positive electrode tab 110C. A width in the Y direction of the collection portion of the plurality of positive electrode current collectors 102*a*C decreases from the battery element 100C toward the front. In FIG. 18, the plurality of collected positive electrode current collectors 102*a*C drawn from the battery element 100C are schematically illustrated to have a triangular shape.

As illustrated in FIG. 17, the negative electrode tab 120C is disposed on the rear of the battery element 100C. A front end portion of the negative electrode tab 120C is electrically connected to a negative electrode current collector 104*a*C. The negative electrode current collector 104*a*C is drawn from the negative electrode to the rear. In this way, the negative electrode tab 120C is electrically connected to the plurality of negative electrodes. Similarly to the example illustrated in FIG. 18, a collection portion of a plurality of the negative electrode current collectors 104*a*C is present between the battery element 100C and the negative electrode tab 120C.

The front lid member 210C covers a front end portion of the battery element 100C. The front lid member 210C is formed of, for example, resin, metal, or the like. A front end portion of the positive electrode tab 110C is drawn from a front surface of the front lid member 210C toward the front. When viewed from the front, the front lid member 210C has a substantially rectangular shape. When viewed from the front, a longitudinal direction of the front lid member 210C is substantially parallel to the Z direction, and a transverse direction of the front lid member 210C is substantially parallel to the Y direction.

The rear lid member 220C covers a rear end portion of the battery element 100C. The rear lid member 220C is formed of, for example, resin, metal, or the like. A rear end portion of the negative electrode tab 120C is drawn from a rear surface of the rear lid member 220C toward the rear. When viewed from the rear, the rear lid member 220C has a substantially rectangular shape. When viewed from the rear, a longitudinal direction of the rear lid member 220C is substantially parallel to the Z direction, and a transverse direction of the rear lid member 220C is substantially parallel to the Y direction.

As illustrated in FIGS. 15 and 16, the wrapped portion 302C has a substantially tubular shape open toward both of the front and the rear. The front lid member 210C is disposed inside the front opening of the wrapped portion 302C. The rear lid member 220C is disposed inside the rear opening of the wrapped portion 302C. The wrapped portion 302C is wrapped one revolution around the X direction of the battery element 100C, the front lid member 210C, and the rear lid member 220C. In this way, the front lid member 210C, the rear lid member 220C, and the wrapped portion 302C form a housing space 500C that houses the battery element 100C. An unillustrated electrolytic solution is housed together with the battery element 100C in the housing space 500C. A state of wrapping of the wrapped portion 302C around the battery element 100C is not limited to the example described above.

An outer circumferential surface of the front lid member 210C around the X direction and an inner circumferential surface of the front opening of the wrapped portion 302C around the X direction are bonded to each other by thermal bonding, for example. In this way, a front sealing portion 510C is formed.

An outer circumferential surface of the rear lid member 220C around the X direction and an inner circumferential surface of the rear opening of the wrapped portion 302C around the X direction are bonded to each other by thermal bonding, for example. In this way, a rear sealing portion 520C is formed.

As illustrated in FIGS. 15 and 16, when viewed from the front, the drawn portion 304C is drawn from a corner of the wrapped portion 302C on an upper left side of the battery element 100C. Specifically, as illustrated in FIG. 16, the drawn portion 304C includes a first drawn portion 304*a*C and a second drawn portion 304*b*C. The first drawn portion 304*a*C is drawn from one of both ends of the wrapped portion 302C in a circumferential direction around the X direction. The second drawn portion 304*b*C is drawn from the other of both ends of the wrapped portion 302C in the circumferential direction around the X direction. The first drawn portion 304*a*C and the second drawn portion 304*b*C are bonded to each other by thermal bonding, for example. In this way, when viewed from the front, a lateral sealing portion 530C is formed. The drawn portion 304C is folded along an upper surface of the battery element 100C. However, the drawn portion 304C may not be folded. A shape of the fold of the drawn portion 304C is not limited to the shape according to the third embodiment.

As illustrated in FIG. 17, the exterior film 300C includes a front portion 310C, a rear portion 320C, and a central portion 330C. The front portion 310C is located on a circumference around the X direction of the collection portion of the positive electrode current collector 102*a*C. The rear portion 320C is located on a circumference around the X direction of the collection portion of the negative electrode current collector 104*a*C. The central portion 330C is located between the front portion 310C and the rear portion 320C in the X direction. The central portion 330C is located on a circumference around the X direction of the battery element 100C.

In the exterior film 300C, no wrinkle is present in the central portion 330C, and a wrinkle is present in at least one of the front portion 310C and the rear portion 320C. A wrinkle may be formed in the exterior film 300C due to a distortion in a shape of the exterior film 300C. If a wrinkle is present in the central portion 330C, the wrinkle may be transferred to the battery element 100C. In this way, a characteristic of the battery cell 10C may be affected by the wrinkle. For example, in a portion in presence of a wrinkle, an ion resistance may vary because unevenness may occur in an interval between a positive electrode and a negative electrode. As another example, unevenness of an interval between a positive electrode and a negative electrode may further accelerate deterioration in a portion having a relatively small resistance between the positive electrode and the negative electrode than in another portion. It is relatively difficult to remove a wrinkle itself of the exterior film 300C. In the third embodiment, even if a wrinkle is formed in the central portion 330C, the wrinkle is moved to at least one of the front portion 310C and the rear portion 320C. The wrinkle present in the front portion 310C or the rear portion 320C is less likely to affect a characteristic of the battery cell 10C. Thus, in the third embodiment, a characteristic of the battery cell 10C can be stabilized. Furthermore, in the third embodiment, a space formed by the wrinkle on an inner side of the front portion 310C or the rear portion 320C can be used as a space for housing an electrolytic solution and a space for housing gas.

The wrinkle of the exterior film 300C may be generated due to, for example, a difference between a size of the battery element 100C and a size of the front lid member 210C or the rear lid member 220C when viewed from the X direction.

In one example, when viewed from the X direction, a size of the front lid member 210C may be larger than a size of the battery element 100C. For example, a length of the front lid member 210C in the Y direction may be longer than a thickness of the battery element 100C in the Y direction. For example, a plurality of the battery cells 10C may be stacked in the Y direction to form a battery module. In this example, a compression pad may be disposed between the central portions 330C of the battery cells 10C adjacent to each other in the Y direction. In this battery module, a length of the front lid member 210C in the Y direction may be longer than a thickness of the battery element 100C in the Y direction by an amount corresponding to a thickness of the compression pad in the Y direction. In this way, the plurality of battery cells 10C can be stably stacked in the Y direction. Similarly to the example described above, when viewed from the X direction, a size of the rear lid member 220C may be larger than a size of the battery element 100C.

In another example, when viewed from the X direction, a size of the front lid member 210C may be smaller than a size of the battery element 100C. For example, a length of the front lid member 210C in the Y direction may be shorter than a thickness of the battery element 100C in the Y direction. For example, the plurality of battery cells 10C may be stacked in the Y direction to form a battery module. In this example, when a length of the front lid member 210C in the Y direction is shorter than a thickness of the battery element 100C in the Y direction, contact and interference between the front lid members 210C adjacent to each other in the Y direction can be suppressed. An actual thickness of the battery element 100C in the Y direction may be thinner than a designed thickness of the battery element 100C in the Y direction due to a tolerance of a thickness of the battery element 100C in the Y direction. Even in this case, when a length of the front lid member 210C in the Y direction is shorter than a thickness of the battery element 100C in the Y direction, the plurality of battery cells 10C can be stably stacked in the Y direction to form the battery module.

Figure 19:
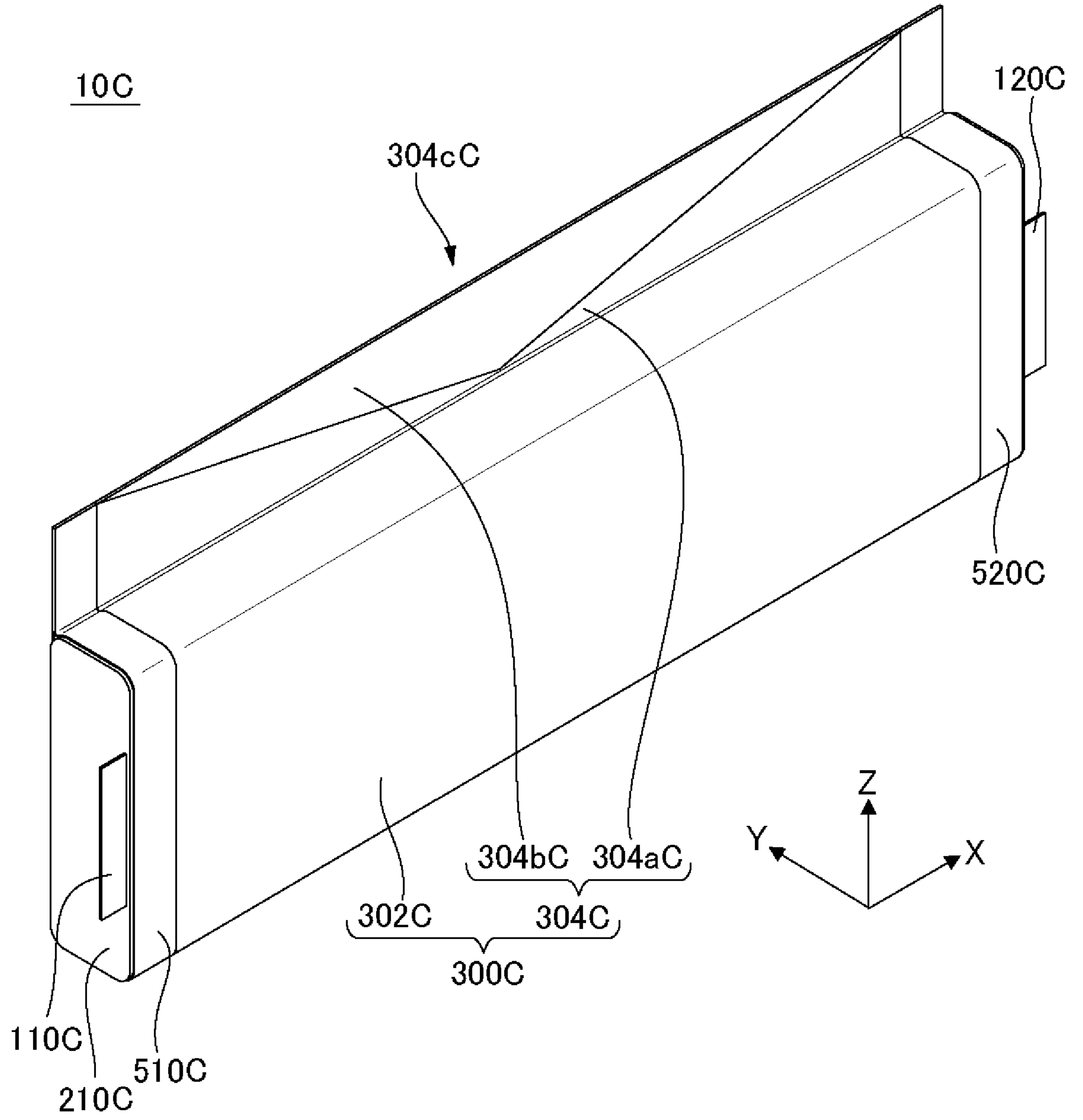
FIG. 19 is a diagram illustrating a first example of a method of manufacturing a battery cell according to the third embodiment.

FIG. 19 is a diagram illustrating a first example of a method of manufacturing the battery cell 10C according to the third embodiment. In this first example, the battery cell 10C is manufactured as follows.

First, the battery element 100C is manufactured. The battery element 100C includes at least one positive electrode, at least one negative electrode, and at least one separator.

Next, the positive electrode tab 110C and the front lid member 210C are bonded to each other. Similarly, the negative electrode tab 120C and the rear lid member 220C are bonded to each other. Next, the positive electrode tab 110C and the positive electrode current collector 102*a*C are bonded to each other. Similarly, the negative electrode tab 120C and the negative electrode current collector 104*a*C are bonded to each other. However, after the positive electrode tab 110C and the positive electrode current collector 102*a*C are bonded to each other, the positive electrode tab 110C and the front lid member 210C may be bonded to each other. Similarly, after the negative electrode tab 120C and the negative electrode current collector 104*a*C are bonded to each other, the negative electrode tab 120C and the rear lid member 220C may be bonded to each other.

Next, the exterior film 300C is wrapped around the X direction of the battery element 100C, the front lid member 210C, and the rear lid member 220C. In this way, the wrapped portion 302C is formed around the X direction of the battery element 100C, the front lid member 210C, and the rear lid member 220C. An extra length of the exterior film 300C is drawn as the drawn portion 304C from the wrapped portion 302C.

Next, the outer circumferential surface of the front lid member 210C around the X direction and the inner circumferential surface of the front opening of the wrapped portion 302C around the X direction are bonded to each other by thermal bonding. In this way, the front sealing portion 510C is formed. Next, the outer circumferential surface of the rear lid member 220C around the X direction and the inner circumferential surface of the rear opening of the wrapped portion 302C around the X direction are bonded to each other by thermal bonding. In this way, the rear sealing portion 520C is formed.

Next, as illustrated in FIG. 19, an electrolytic solution is injected into the housing space 500C via a solution injection opening 304*c*C. The solution injection opening 304*c*C is formed by a gap between the first drawn portion 304*a*C and the second drawn portion 304*b*C.

Next, the housing space 500C is vacuum-sealed. Specifically, after a vacuum is drawn from the housing space 500C via the solution injection opening 304*c*C, the lateral sealing portion 530C is formed by bonding first drawn portion 304*a*C and the second drawn portion 304*b*C to each other by thermal bonding. A wrinkle may be formed in the exterior film 300C due to the vacuum drawn from the housing space 500C. If the wrinkle is present in the central portion 330C, the wrinkle is moved to at least one of the front portion 310C and the rear portion 320C.

Next, the drawn portion 304C is folded along the upper surface of the battery element 100C.

In this way, the battery cell 10C is manufactured.

Figure 20:
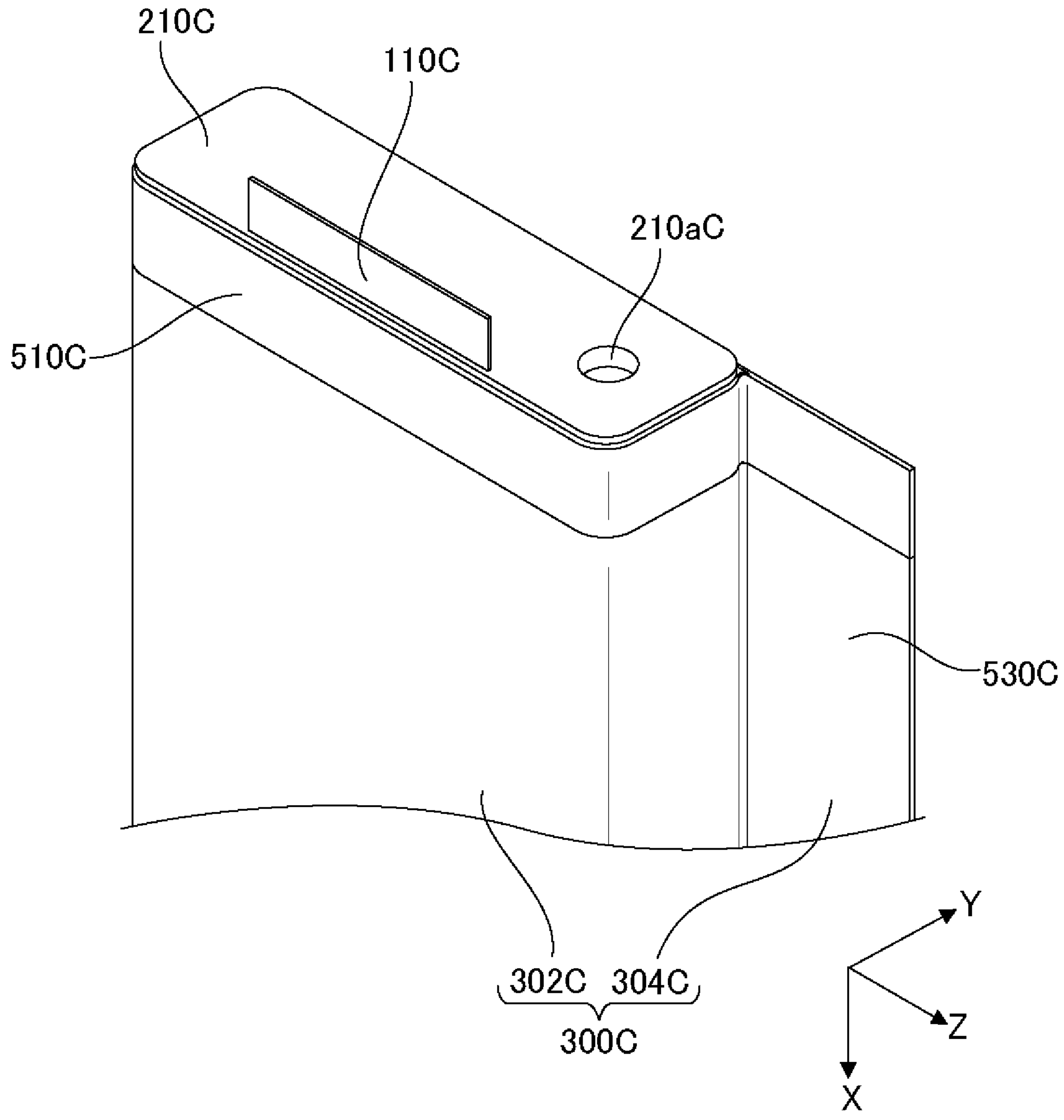
FIG. 20 is a diagram illustrating a second example of the method of manufacturing a battery cell according to the third embodiment.

FIG. 20 is a diagram illustrating a second example of the method of manufacturing the battery cell 10C according to the third embodiment. This second example is similar to the first example described above except for the following points.

First, similarly to the first example, the battery element 100C is manufactured. Next, similarly to the first example, the positive electrode tab 110C and the front lid member 210C are bonded to each other. The negative electrode tab 120C and the rear lid member 220C are bonded to each other. Next, similarly to the first example, the positive electrode tab 110C and the positive electrode current collector 102*a*C are bonded to each other. The negative electrode tab 120C and the negative electrode current collector 104*a*C are bonded to each other.

Next, the wrapped portion 302C and the drawn portion 304C are formed by wrapping the exterior film 300C around the X direction of the battery element 100C, the front lid member 210C, and the rear lid member 220C. Next, the outer circumferential surface of the front lid member 210C around the X direction and the inner circumferential surface of the front opening of the wrapped portion 302C around the X direction are bonded to each other by thermal bonding. In this way, the front sealing portion 510C is formed. Next, the outer circumferential surface of the rear lid member 220C around the X direction and the inner circumferential surface of the rear opening of the wrapped portion 302C around the X direction are bonded to each other by thermal bonding. In this way, the rear sealing portion 520C is formed. Next, the first drawn portion 304*a*C and the second drawn portion 304*b*C are bonded to each other by thermal bonding. In this ay, the lateral sealing portion 530C is formed.

Next, as illustrated in FIG. 20, an electrolytic solution is injected into the housing space 500C via a solution injection hole 210*a*C provided in the front lid member 210C. Next, the housing space 500C is vacuum-sealed. Specifically, after a vacuum is drawn from the housing space 500C via the solution injection hole 210*a*C, the solution injection hole 210*a*C is covered by a predetermined lid component. A wrinkle may be formed in the exterior film 300C due to the vacuum drawn from the housing space 500C. If the wrinkle is present in the central portion 330C, the wrinkle is moved to at least one of the front portion 310C and the rear portion 320C. The solution injection hole may be provided in the rear lid member 220C.

Next, similarly to the first example, the drawn portion 304C is folded along the upper surface of the battery element 100C.

In this way, the battery cell 10C is manufactured.

Figure 21:
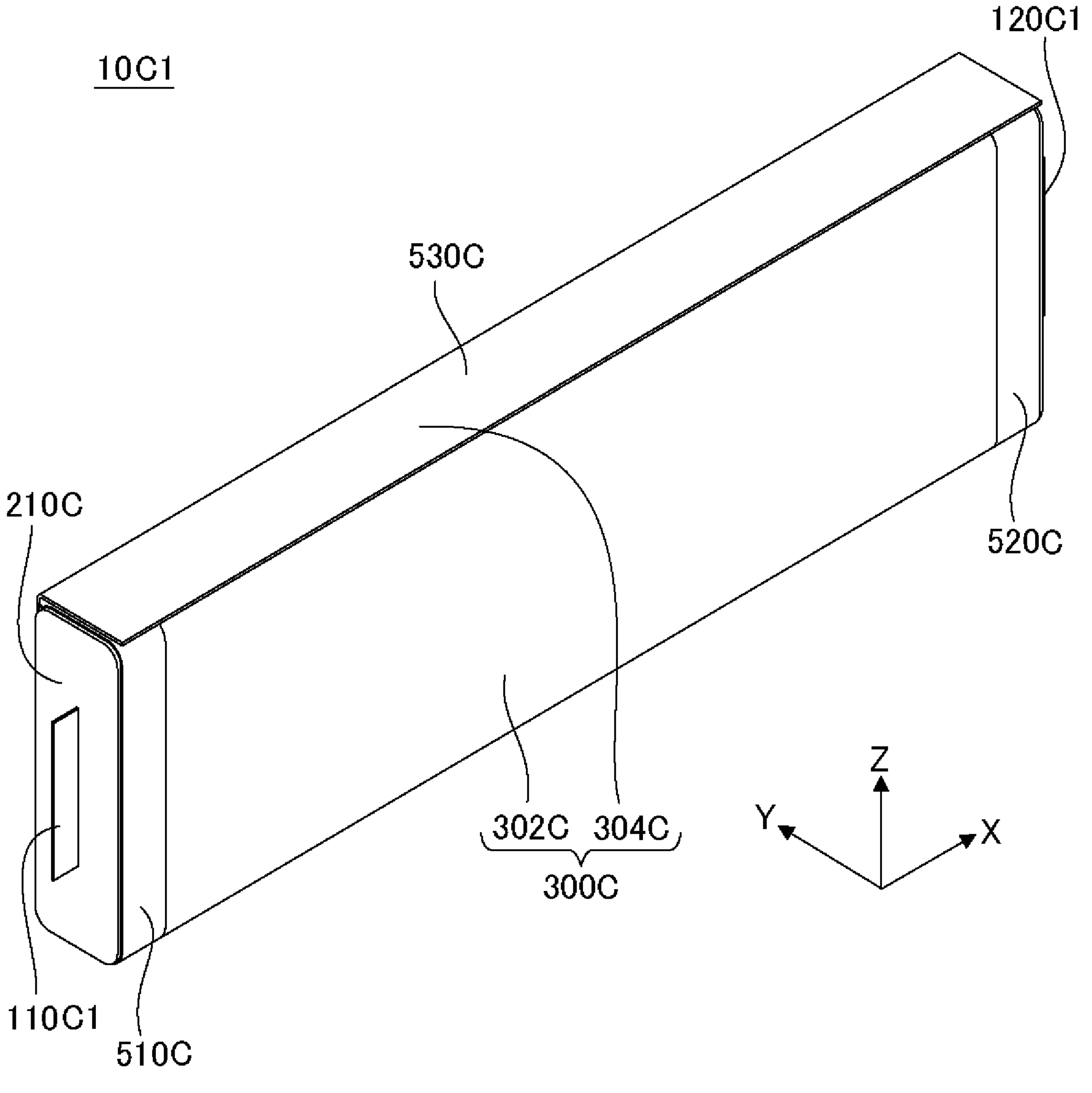
FIG. 21 is a front perspective view of a battery cell according to a variant.

FIG. 21 is a front perspective view of a battery cell 10C1 according to a variant. The battery cell 10C1 according to the variant is similar to the battery cell 10C according to the third embodiment except for the following points.

In the variant, a positive electrode tab 110C1 is drawn approximately from the center of the front lid member 210C in the Y direction. A negative electrode tab 120C1 is drawn approximately from the center of the rear lid member in the Y direction. Also in the variant, the collection portion of the plurality of positive electrode current collectors is present between the battery element and the positive electrode tab 110C1. Similarly, the collection portion of the plurality of the negative electrode current collectors is present between the battery element and the negative electrode tab 120C1. Also in the variant, a wrinkle of the exterior film 300C is present around the collection portions of the exterior film 300C. Accordingly, also in the variant, similarly to the third embodiment, a characteristic of the battery cell can be stabilized.

While the third embodiment and the variant of the present invention have been described with reference to the drawings, the embodiment and the variant are only exemplification of the present invention, and various configurations other than the above may be employed.

For example, in the third embodiment, the positive electrode tab 110C and the negative electrode tab 120C are disposed on opposite sides to each other in the X direction of the battery element 100C. However, both of the positive electrode tab 110C and the negative electrode tab 120C may be disposed on only one of a front side and a rear side in the X direction of the battery element 100C. In this case, for example, two lid members cover the front end portion and the rear end portion of the battery element 100C. Alternatively, a lid member may cover only a side of the battery element 100C from which the positive electrode tab 110C and the negative electrode tab 120C are drawn. In this example, the exterior film 300C may be sealed and folded along the battery element 100C on an opposite side to the lid member of the battery element 100C.

Fourth Embodiment

Hereinafter, a fourth embodiment and variants of the present invention will be described by using drawings. In all of the drawings, a similar component has a similar reference sign, and description thereof will be appropriately omitted.

Figure 22:
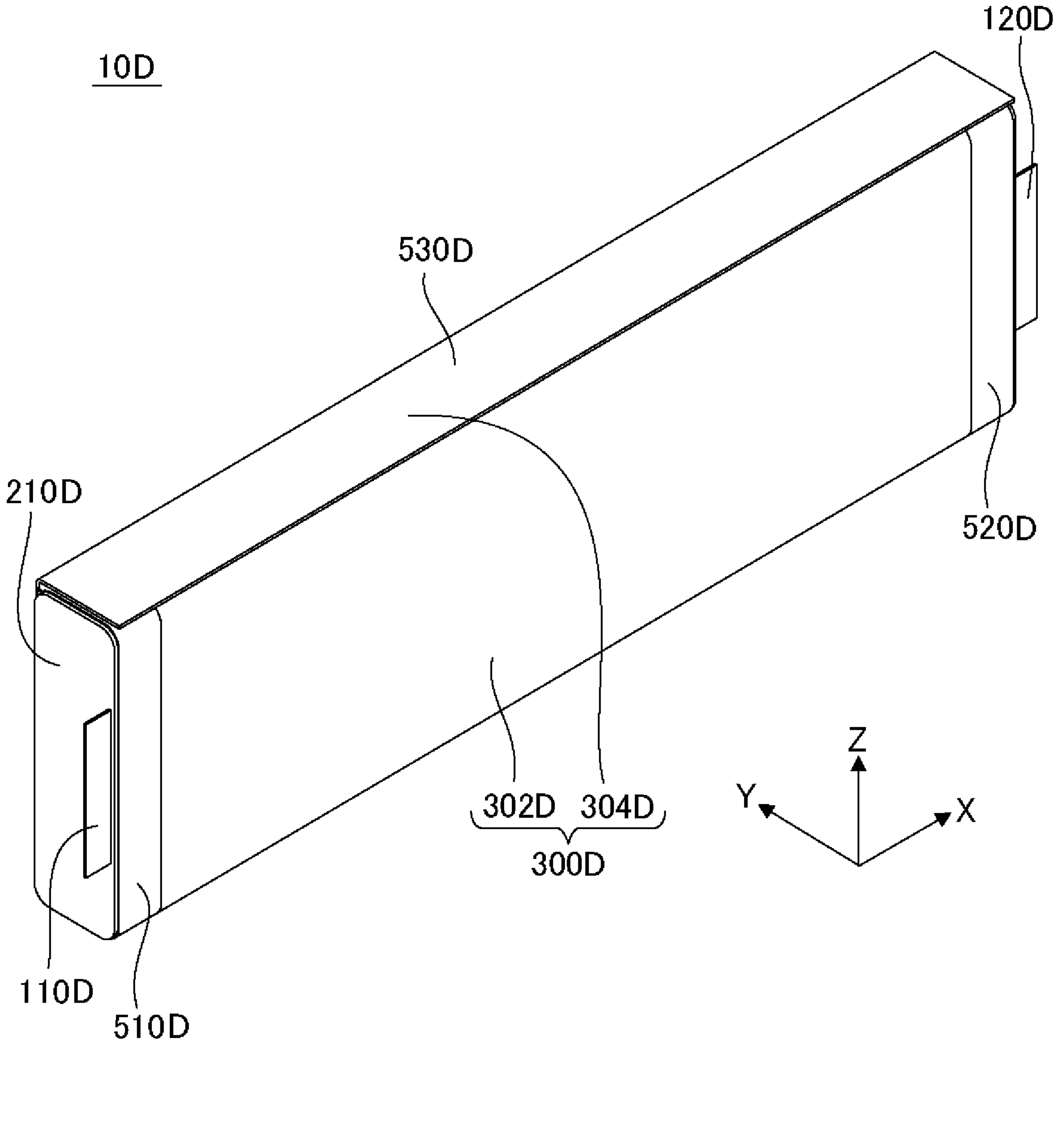
FIG. 22 is a front perspective view of a battery cell according to a fourth embodiment.
Figure 23:
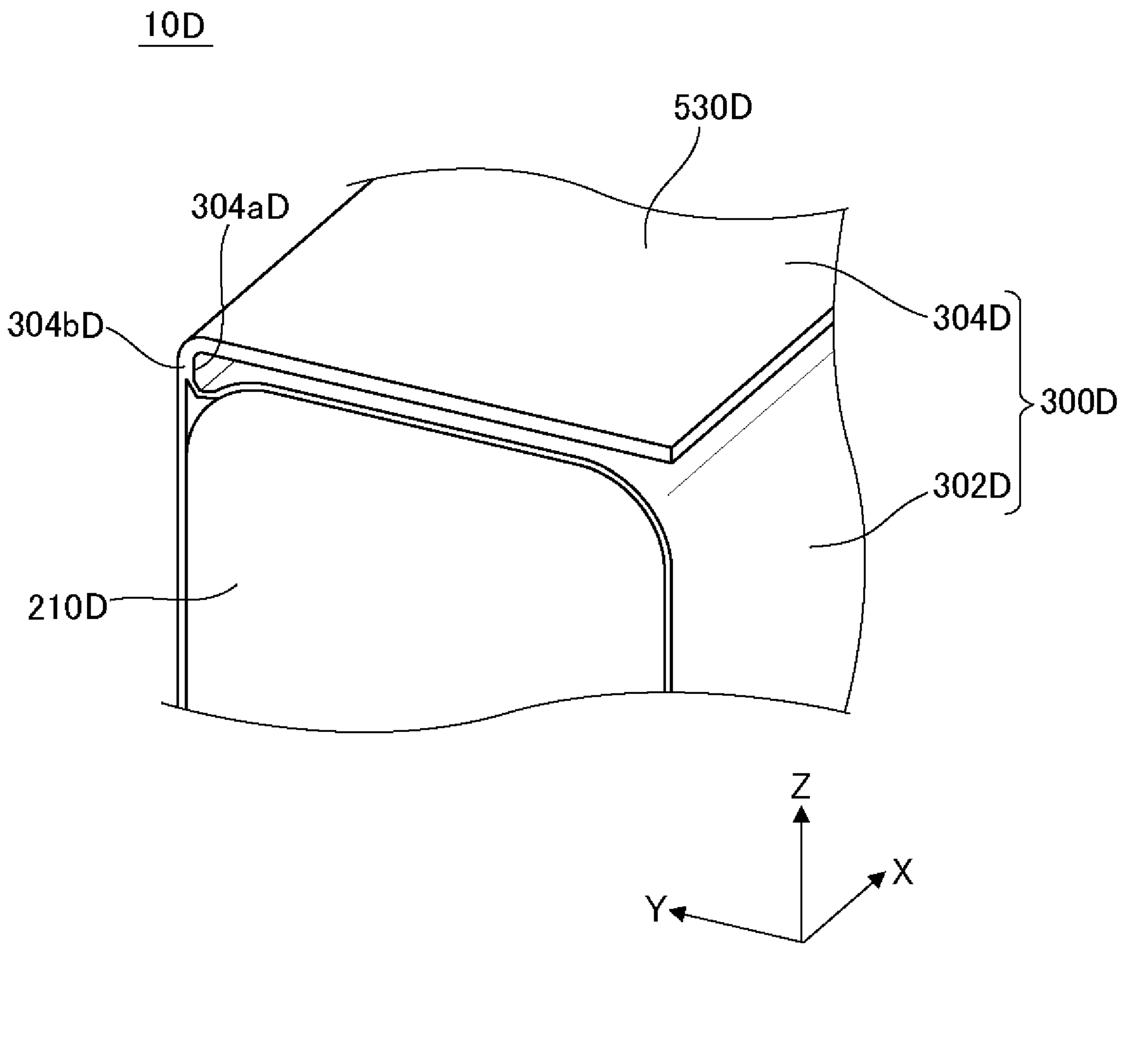
FIG. 23 is a front enlarged perspective view of a part of the battery cell according to the fourth embodiment.
Figure 24:
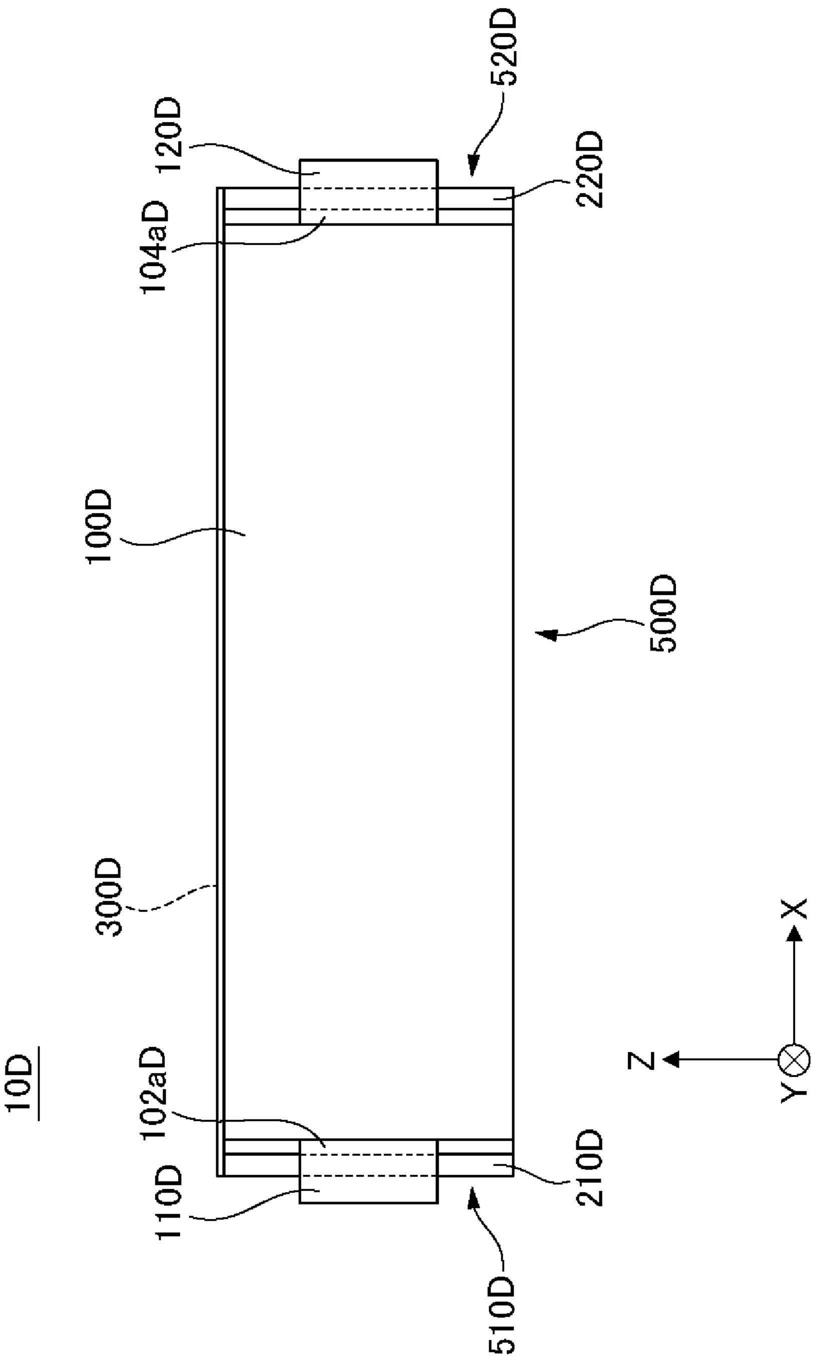
FIG. 24 is a right side view of the battery cell according to the fourth embodiment.

FIG. 22 is a front perspective view of a battery cell 10D according to the fourth embodiment. FIG. 23 is a front enlarged perspective view of a part of the battery cell 10D according to the fourth embodiment. FIG. 24 is a right side view of the battery cell 10D according to the fourth embodiment. In FIG. 24, an exterior film 300D is illustrated to be transparent for description.

In each drawing, an X direction, a Y direction, and a Z direction are provided for description. The X direction indicates a front-rear direction of the battery cell 10D. The Y direction is orthogonal to the X direction. The Y direction indicates a left-right direction of the battery cell 10D. The Z direction is orthogonal to both of the X direction and the Y direction. The Z direction indicates an up-down direction of the battery cell 10D. A direction pointed by an arrow indicating the X direction, a direction pointed by an arrow indicating the Y direction, and a direction pointed by an arrow indicating the Z direction are a rear direction, a left direction, and an upward direction, respectively. However, a relationship among the X direction, the Y direction, the Z direction, the front-rear direction, the left-right direction, and the up-down direction of the battery cell 10D is not limited to this example.

A white circle with an X indicating the X direction, the Y direction, or the Z direction indicates that a direction from the front to the back of the paper plane is a direction pointed by an arrow indicating the direction. A white circle with a black dot indicating the X direction, the Y direction, or the Z direction indicates that a direction from the back to the front of the paper plane is a direction pointed by an arrow indicating the direction.

The battery cell 10D includes a battery element 100D, a positive electrode tab 110D, a negative electrode tab 120D, a front lid member 210D, a rear lid member 220D, and the exterior film 300D. The exterior film 300D includes a wrapped portion 302D and a drawn portion 304D.

The battery element 100D has an approximate rectangular cuboid shape. A longitudinal direction of the battery element 100D is substantially parallel to the X direction. A length of the battery element 100D in the X direction may be, for example, but is not limited to, equal to or more than 300 mm and equal to or less than 500 mm, preferably, equal to or less than 450 mm. A transverse direction of the battery element 100D is substantially parallel to the Z direction. A length of the battery element 100D in the Z direction may be, for example, but is not limited to, equal to or more than 90 mm and equal to or less than 130 mm, preferably, equal to or less than 120 mm. A thickness direction of the battery element 100D is substantially parallel to the Y direction. A thickness of the battery element 100D in the Y direction may be, for example, but is not limited to, equal to or more than 20 mm and equal to or less than 50 mm, preferably, equal to or less than 45 mm. However, a shape of the battery element 100D is not limited to this example.

The battery element 100D includes at least one unillustrated positive electrode, at least one unillustrated negative electrode, and at least one unillustrated separator. For example, a plurality of the positive electrodes and a plurality of the negative electrodes are alternately stacked in the Y direction. At least a part of the separator is located between the positive electrode and the negative electrode adjacent to each other in the Y direction. For example, each of a plurality of sheet-shaped separators may be located between the positive electrode and the negative electrode adjacent to each other in the Y direction. Alternatively, a separator having a fanfold shape may be alternately folded at both ends in the Z direction. In this example, a portion of the separator located between the both ends in the Z direction is disposed between the positive electrode and the negative electrode adjacent to each other in the Y direction. Alternatively, the positive electrode, the negative electrode, and the separator may be wound with the separator located between the positive electrode and the negative electrode. In one example, the positive electrode, the negative electrode, and the separator are wound with both sides of one of the positive electrode and the negative electrode covered by the separator. In another example, a stacked body including a plurality of unit stacked bodies including the positive electrode, the separator, and the negative electrode in this order may be wound. However, a winding structure of the positive electrode, the negative electrode, and the separator is not limited to these examples.

As illustrated in FIG. 24, the positive electrode tab 110D is disposed on the front of the battery element 100D. The positive electrode tab 110D is electrically connected to a positive electrode current collector 102*a*D. The positive electrode current collector 102*a*D is drawn from the positive electrode of the battery element 100D to the front. In this way, the positive electrode tab 110D is electrically connected to the plurality of positive electrodes of the battery element 100D.

As illustrated in FIG. 24, the negative electrode tab 120D is disposed on the rear of the battery element 100D. The negative electrode tab 120D is electrically connected to a negative electrode current collector 104*a*D. The negative electrode current collector 104*a*D is drawn from the negative electrode of the battery element 100D to the rear. In this way, the negative electrode tab 120D is electrically connected to the plurality of negative electrodes of the battery element 100D.

The front lid member 210D covers a front end portion of the battery element 100D. The front lid member 210D is formed of, for example, resin, metal, or the like. A front end portion of the positive electrode tab 110D protrudes from a front surface of the front lid member 210D. When viewed from the front, the front lid member 210D has a substantially rectangular shape. When viewed from the front, a longitudinal direction of the front lid member 210D is substantially parallel to the Z direction, and a transverse direction of the front lid member 210D is substantially parallel to the Y direction.

The rear lid member 220D covers a rear end portion of the battery element 100D. The rear lid member 220D is formed of, for example, resin, metal, or the like. A rear end portion of the negative electrode tab 120D protrudes from a rear surface of the rear lid member 220D. When viewed from the rear, the rear lid member 220D has a substantially rectangular shape. When viewed from the rear, a longitudinal direction of the rear lid member 220D is substantially parallel to the Z direction, and a transverse direction of the rear lid member 220D is substantially parallel to the Y direction.

As illustrated in FIGS. 22 and 23, the wrapped portion 302D has a substantially tubular shape open toward both of the front and the rear. The front lid member 210D is disposed inside the front opening of the wrapped portion 302D. The rear lid member 220D is disposed inside the rear opening of the wrapped portion 302D. The wrapped portion 302D is wrapped one revolution around the X direction of the battery element 100D, the front lid member 210D, and the rear lid member 220D. In this way, the front lid member 210D, the rear lid member 220D, and the wrapped portion 302D form a housing space 500D that houses the battery element 100D. An unillustrated electrolytic solution is housed together with the battery element 100D in the housing space 500D. A state of wrapping of the wrapped portion 302D around the battery element 100D is not limited to the example described above.

An outer circumferential surface of the front lid member 210D around the X direction and an inner circumferential surface of the front opening of the wrapped portion 302D around the X direction are bonded to each other by thermal bonding, for example. In this way, a front sealing portion 510D is formed.

An outer circumferential surface of the rear lid member 220D around the X direction and an inner circumferential surface of the rear opening of the wrapped portion 302D around the X direction are bonded to each other by thermal bonding, for example. In this way, a rear sealing portion 520D is formed.

As illustrated in FIGS. 22 and 23, when viewed from the front, the drawn portion 304D is drawn from a corner of the wrapped portion 302D on an upper left side of the battery element 100D. Specifically, as illustrated in FIG. 23, the drawn portion 304D includes a first drawn portion 304*a*D and a second drawn portion 304*b*D. The first drawn portion 304*a*D is drawn from one of both ends of the wrapped portion 302D in a circumferential direction around the X direction. The second drawn portion 304*b*D is drawn from the other of both ends of the wrapped portion 302D in the circumferential direction around the X direction. The first drawn portion 304*a*D and the second drawn portion 304*b*D are bonded to each other by thermal bonding, for example. In this way, when viewed from the front, a lateral sealing portion 530D is formed. The drawn portion 304D is folded along an upper surface of the battery element 100D. However, the drawn portion 304D may not be folded. A shape of the fold of the drawn portion 304D is not limited to the shape according to the fourth embodiment.

Figure 25:
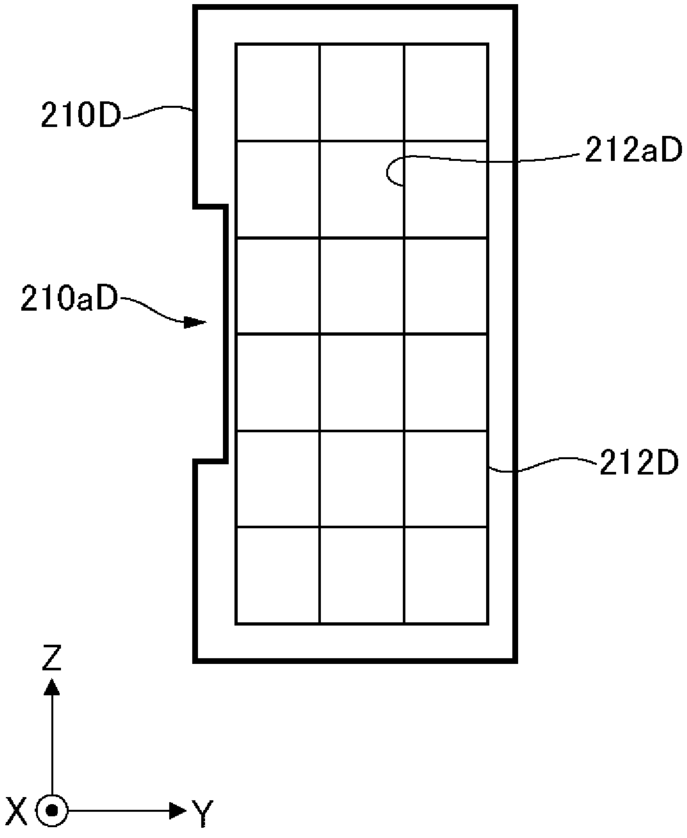
FIG. 25 is a rear view of a front lid member according to the fourth embodiment.

FIG. 25 is a rear view of the front lid member 210D according to the fourth embodiment. With reference to FIG.

25, as necessary, with reference to FIGS. 22 to 24, the front lid member 210D will be described.

The front lid member 210D is provided with a front notch 210aD. The positive electrode tab 110D is drawn from the front lid member 210D to the front through the front notch 210aD. A position in which the front notch 210aD is provided is not limited to the example illustrated in FIG. 25.

A rib 212D is provided on a rear surface of the front lid member 210D. The rib 212D protrudes from the rear surface of the front lid member 210D to the rear. The rib 212D can function as a reinforcing body that reinforces strength of the front lid member 210D. The thickness of the front lid member 210D in the X direction can be thus thinner with the strength of the front lid member 210D secured in the fourth embodiment than when the rib 212D is not provided.

In the example illustrated in FIG. 25, when viewed from the X direction, the rib 212D extends in a substantially quadrilateral grid frame shape. A space 212aD is therefore defined in a region surrounded by each frame of the rib 212D when viewed from the X direction. The space 212aD communicates with the housing space 500D. An excess electrolytic solution can be thus housed in the space 212aD. This can easily suppress a decrease in performance of the battery cell 10D due to the electrolytic solution drying up. Thus, the life of the battery cell 10D can be extended. Alternatively, at least a part of the positive electrode current collector 102aD can be housed in the space 212aD.

A position in which the rib 212D is provided is not limited to the example illustrated in FIG. 25. The rib 212D may be provided on, for example, the front surface of the front lid member 210D. A shape of the rib 212D when viewed from the X direction is not limited to the example illustrated in FIG. 25.

Similarly to the front lid member 210D, a rib can also be provided on the rear lid member 220D.

Next, one example of a method of manufacturing the battery cell 10D according to the fourth embodiment will be described. In this example, the battery cell 10D is manufactured as follows.

First, the battery element 100D is manufactured. The battery element 100D includes at least one positive electrode, at least one negative electrode, and at least one separator.

Next, the positive electrode tab 110D and the front lid member 210D are bonded to each other. Similarly, the negative electrode tab 120D and the rear lid member 220D are bonded to each other. Next, the positive electrode tab 110D and the positive electrode current collector 102aD are bonded to each other. Similarly, the negative electrode tab 120D and the negative electrode current collector 104aD are bonded to each other. However, after the positive electrode tab 110D and the positive electrode current collector 102aD are bonded to each other, the positive electrode tab 110D and the front lid member 210D may be bonded to each other. Similarly, after the negative electrode tab 120D and the negative electrode current collector 104aD are bonded to each other, the negative electrode tab 120D and the rear lid member 220D may be bonded to each other.

Next, the exterior film 300D is wrapped one revolution around the X direction of the battery element 100D, the front lid member 210D, and the rear lid member 220D. In this way, the wrapped portion 302D is formed. An extra length of the exterior film 300D is drawn as the drawn portion 304D.

Next, the outer circumferential surface of the front lid member 210D around the X direction and the inner circumferential surface of the front opening of the wrapped portion 302D around the X direction are bonded to each other by thermal bonding. In this way, the front sealing portion 510D is formed. Next, the outer circumferential surface of the rear lid member 220D around the X direction and the inner circumferential surface of the rear opening of the wrapped portion 302D around the X direction are bonded to each other by thermal bonding. In this way, the rear sealing portion 520D is formed.

Next, an electrolytic solution is injected into the housing space 500D via a gap between the first drawn portion 304aD and the second drawn portion 304bD. Next, the vacuum is drawn from the housing space 500D via the gap between the first drawn portion 304aD and the second drawn portion 304bD. Next, the lateral sealing portion 530D is formed by bonding the first drawn portion 304aD and the second drawn portion 304bD by thermal bonding. In this way, the housing space 500D is vacuum-sealed.

A method of vacuum-sealing the housing space 500D is not limited to the above-described example. In another example, first, the lateral sealing portion 530D is formed by bonding the first drawn portion 304aD and the second drawn portion 304bD by thermal bonding. Next, an electrolytic solution is injected into the housing space 500D via a solution injection hole provided in at least one of the front lid member 210D and the rear lid member 220D. Next, the vacuum is drawn from the housing space 500D via the solution injection hole. Next, the solution injection hole is covered by a predetermined lid member.

Next, the lateral sealing portion 530D is folded along the upper surface of the battery element 100D.

In this way, the battery cell 10D is manufactured.

Figure 26:
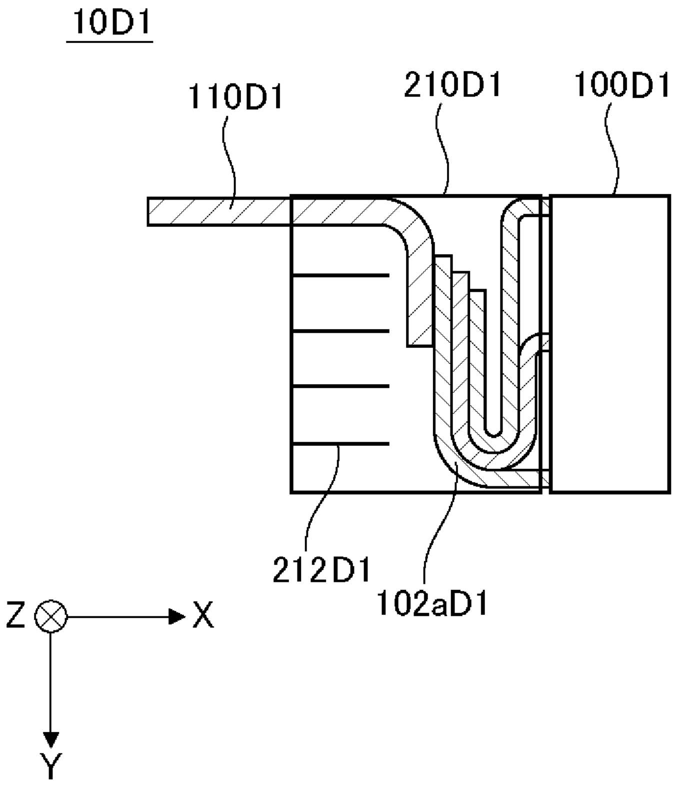
FIG. 26 is a side view of a part of a battery cell according to a first variant.
Figure 27:
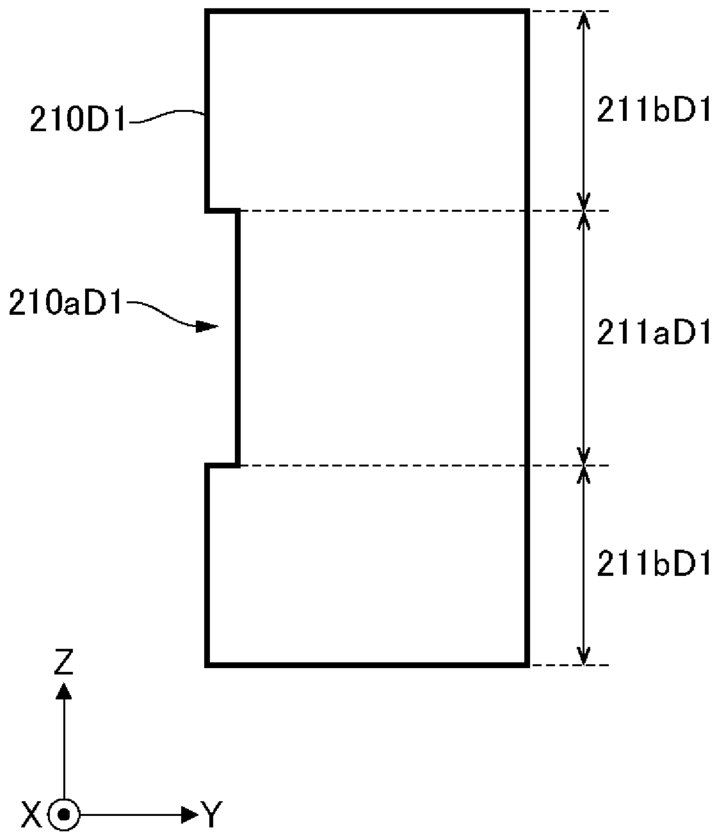
FIG. 27 is a rear view of a front lid member according to the first variant.

FIG. 26 is a side view of a part of a battery cell 10D1 according to a first variant. FIG. 27 is a rear view of a front lid member 210D1 according to the first variant. In FIG. 26, a part of the front lid member 210D1 is illustrated to be transparent for description. FIG. 26 does not illustrate an exterior film for simplifying the description. FIG. 27 does not illustrate a rib 212D1 for description. The battery cell 10D1 according to the first variant is similar to the battery cell 10D according to the fourth embodiment except for the following points. The matter described by using FIGS. 26 and 27 can also be similarly applied to a rear lid member and a negative electrode tab.

As illustrated in FIG. 26, a front end portion of a plurality of positive electrode current collectors 102aD1 and a rear end portion of a positive electrode tab 110D1 are bonded to each other. The plurality of positive electrode current collectors 102aD1 are drawn from a battery element 100D1 to the front. The plurality of positive electrode current collectors 102aD1 are folded to overlap the battery element 100D1 in the X direction inside the front lid member 210D1. The front end portion of the plurality of positive electrode current collectors 102aD1 is substantially parallel to the Y direction. A front end portion of the positive electrode tab 110D1 is drawn to the front through a front notch 210aD1 of the front lid member 210D1. A rear end portion of the positive electrode tab 110D1 is bent at a predetermined angle with respect to the front end portion of the positive electrode tab 110D1 inside the front lid member 210D1. Specifically, when viewed from the Z direction, the rear end portion of the positive electrode tab 110D1 is bent at a substantially right angle with respect to the front end portion of the positive electrode tab 110D1 inside the front lid member 210D1. In this way, the rear end portion of the positive electrode tab 110D1 is substantially parallel to the Y direction. The thickness of the front lid member 210D1 in the X direction can be thinner in the first variant than when the positive electrode current collector 102*a*D1 is not folded or than when the rear end portion of the positive electrode tab 110D1 is not bent and is substantially parallel to the X direction. The volume energy density of the battery cell 10D1 can be therefore more easily improved in the first variant than when the positive electrode current collector 102*a*D1 is not folded or than when the rear end portion of the positive electrode tab 110D1 is substantially parallel to the X direction.

As illustrated in FIG. 26, a protruding direction of the rib 212D1 inside the front lid member 210D1 is substantially parallel to the X direction. A height of the rib 212D1 in the X direction inside the front lid member 210D1 may be different according to a position inside the front lid member 210D1. For example, as illustrated in FIG. 27, the front lid member 210A includes a central region 211*a*D1 and two lateral regions 211*b*D1. The central region 211*a*D1 overlaps the plurality of positive electrode current collectors 102*a*D1 and the positive electrode tab 110D1 in the X direction. The two lateral regions 211*b*D1 are located on both sides of the central region 211*a*D1 in the Z direction. Each of the lateral regions 211*b*D1 does not overlap the plurality of positive electrode current collectors 102*a*D1 and the positive electrode tab 110D1 in the X direction. A height of the rib 212D1 in the X direction in each of the lateral regions 211*b*D1 may be higher than a height of the rib 212D1 in the X direction in the central region 211*a*D1. In this case, the rib 212D1 may not be provided in the central region 211*a*D1, and the rib 212D1 may be provided in each of the lateral regions 211*b*D1. In this way, the rib 212D1 can be prevented from interfering with the plurality of positive electrode current collectors 102*a*D1 and the positive electrode tab 110D1 in the central region 211*a*D1. A height of the rib 212D1 in the X direction can be secured in each of the lateral regions 211*b*D1.

Also in the first variant, at least a part of the rib 212D1 may define a space communicating with a housing space that houses the battery element 100D1.

In the first variant, the plurality of positive electrode current collectors 102*a*D1 are folded in a region overlapping the central region 211*a*D1 in the X direction. However, the plurality of positive electrode current collectors 102*a*D1 may not be folded and simply drawn to the front in the region overlapping the central region 211*a*D1 in the X direction. Also in this example, a height of the rib 212D1 in the X direction in each of the lateral regions 211*b*D1 may be higher than a height of the rib 212D1 in the X direction in the central region 211*a*D1. In this case, the rib 212D1 may not be provided in the central region 211*a*D1, and the rib 212D1 may be provided in each of the lateral regions 211*b*D1. In this way, the rib 212D1 can be prevented from interfering with the plurality of positive electrode current collectors 102*a*D1 and the positive electrode tab 110D1 in the central region 211*a*D1. A height of the rib 212D1 in the X direction can be secured in each of the lateral regions 211*b*D1.

Figure 28:
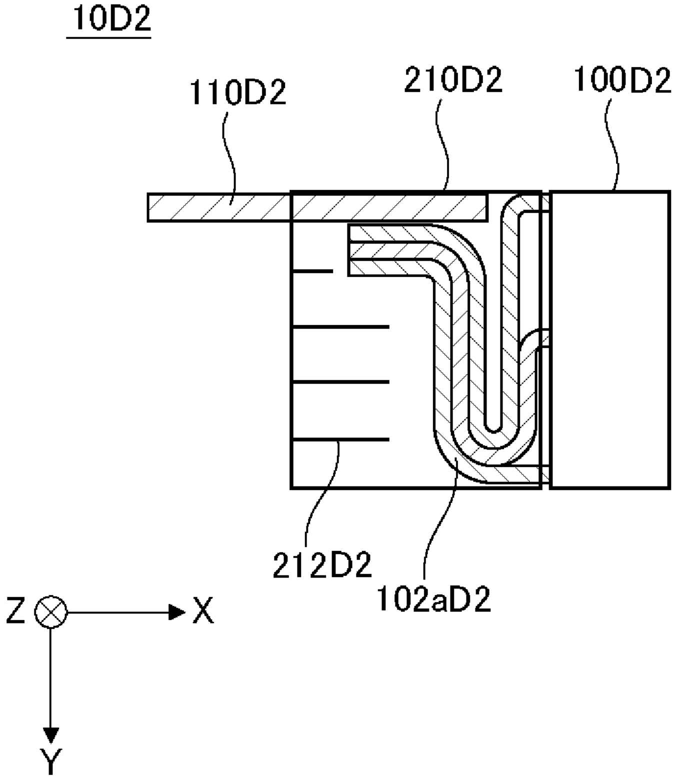
FIG. 28 is a side view of a part of a battery cell according to a second variant.

FIG. 28 is a side view of a part of a battery cell 10D2 according to a second variant. In FIG. 28, a part of a front lid member 210D2 is illustrated to be transparent for description. FIG. 28 does not illustrate an exterior film for simplifying the description. The battery cell 10D2 according to the second variant is similar to the battery cell 10D1 according to the first variant except for the following points. The matter described by using FIG. 28 can also be similarly applied to a rear lid member and a negative electrode tab.

As illustrated in FIG. 28, a front end portion of a plurality of positive electrode current collectors 102*a*D2 and a rear end portion of a positive electrode tab 110D2 are bonded to each other. The plurality of positive electrode current collectors 102*a*D2 are drawn from a battery element 100D2 to the front. The plurality of positive electrode current collectors 102*a*D2 are folded to overlap the battery element 100D2 in the X direction inside the front lid member 210D2. The front end portion of the plurality of positive electrode current collectors 102*a*D2 is bent at a predetermined angle with respect to a folded portion of the plurality of positive electrode current collectors 102*a*D2. Specifically, when viewed from the Z direction, the front end portion of the positive electrode current collectors 102*a*D2 is a bent portion bent at a substantially right angle with respect to the folded portion of the plurality of positive electrode current collectors 102*a*D2 inside the front lid member 210D2. In this way, the front end portion of the plurality of positive electrode current collectors 102*a*D2 is substantially parallel to the X direction. A front end portion of the positive electrode tab 110D2 is drawn to the front via a front notch of the front lid member 210D2. The rear end portion of the positive electrode tab 110D2 is not folded inside the front lid member 210D2 and is substantially parallel to the X direction. The thickness of the front lid member 210D2 in the X direction can be thinner in the second variant than when the positive electrode current collector 102*a*D2 is not folded. The volume energy density of the battery cell 10D2 can be therefore more easily improved in the second variant than when the positive electrode current collector 102*a*D2 is not folded.

As illustrated in FIG. 28, a height of the rib 212D2 in the X direction may be different according to a shape of the plurality of positive electrode current collectors 102*a*D2. In the example illustrated in FIG. 28, a height in the X direction of the rib 212D2 overlapping in the X direction the folded portion of the plurality of positive electrode current collectors 102*a*D2 is higher than a height in the X direction of the rib 212D2 overlapping in the X direction the bent portion of the plurality of positive electrode current collectors 102*a*D2 substantially parallel to the X direction. In this case, the rib 212D2 may not be provided in a region overlapping the bent portion of the plurality of positive electrode current collectors 102*a*D2 in the X direction, and the rib 212D2 may be provided in a region overlapping the folded portion of the plurality of positive electrode current collectors 102*a*D2 in the X direction. In this way, the rib 212D2 can be prevented from interfering with the front end portion of the positive electrode current collector 102*a*D2 in the region overlapping the bent portion of the plurality of positive electrode current collectors 102*a*D2 in the X direction. A height of the rib 212D2 in the X direction can be secured in the region overlapping the folded portion of the plurality of positive electrode current collectors 102*a*D2 in the X direction.

Also in the second embodiment, at least a part of the rib 212D2 may define a space communicating with a housing space that houses the battery element 100D2.

While the fourth embodiment and the variants of the present invention have been described with reference to the drawings, the embodiment and the variants are only exemplification of the present invention, and various configurations other than the above may be employed.

In the fourth embodiment, the positive electrode tab 110D and the negative electrode tab 120D are disposed on opposite sides to each other in the X direction of the battery element 100D. However, both of the positive electrode tab 110D and the negative electrode tab 120D may be disposed on only one of a front side and a rear side in the X direction of the battery element 100D. In this case, for example, two lid members cover the front end portion and the rear end portion of the battery element 100D. Alternatively, a lid member may cover only a side of the battery element 100D from which the positive electrode tab 110D and the negative electrode tab 120D are drawn. In this example, the exterior film 300D may be sealed and folded along the battery element 100D on an opposite side to the lid member of the battery element 100D.

The invention claimed is:

1. A battery cell comprising:
a battery element;
a lid member covering one end portion of the battery element;
an exterior film at least partially wrapped around the battery element;
a rib provided on the lid member; and
a current collector including a folded portion folded inside the lid member and a bent portion bent with respect to the folded portion, the current collector being drawn from the battery element, wherein
a height of the rib in a region overlapping the folded portion of the current collector in a protruding direction of the rib is higher than a height of the rib in a region overlapping the bent portion of the current collector in the protruding direction of the rib.

2. The battery cell according to claim 1, further comprising:
a tab electrically connected to the battery element and drawn from the lid member; and
a bonding member bonding the tab and the lid member to each other.

3. The battery cell according to claim 2, wherein
a notch through which the tab passes is provided in the lid member, and
at least a part of the lid member exposed from the notch is not covered by the bonding member.

4. The battery cell according to claim 2, wherein
a hole through which the tab passes is provided in the lid member, and
the bonding member is provided between an outer circumferential surface of the tab and an inner circumferential surface of the hole.

5. The battery cell according to claim 1, further comprising:
a tab electrically connected to the battery element and drawn from the lid member;
a barrier member provided at the lid member.

6. The battery cell according to claim 5, wherein,
when viewed from a drawn direction of the tab, the barrier member is provided in an area of equal to or more than 85% of an entire area of the lid member.

7. The battery cell according to claim 1, wherein
at least a part of the rib defines a space communicating with a housing space formed by the lid member and the exterior film.

8. The battery cell according to claim 1, wherein
a height of the rib in a region not overlapping the current collector in a protruding direction of the rib is higher than a height of the rib in a region overlapping the current collector in the protruding direction of the rib.

9. A battery cell comprising:
a battery element;
a lid member covering one end portion of the battery element;
an exterior film at least partially wrapped around the battery element;
a rib provided on the lid member; and
a current collector including a folded portion folded inside the lid member and a bent portion bent with respect to the folded portion, the current collector being drawn from the battery element, wherein
the rib is provided in a region overlapping the folded portion of the current collector in a protruding direction of the rib, and
the rib is not provided in a region overlapping the bent portion of the current collector in the protruding direction of the rib.

10. The battery cell according to claim 9, wherein
at least a part of the rib defines a space communicating with a housing space formed by the lid member and the exterior film.

11. The battery cell according to claim 9, wherein
a height of the rib in a region not overlapping the current collector in a protruding direction of the rib is higher than a height of the rib in a region overlapping the current collector in the protruding direction of the rib.

12. The battery cell according to claim 9, further comprising:
a tab electrically connected to the battery element and drawn from the lid member; and
a bonding member bonding the tab and the lid member to each other.

13. The battery cell according to claim 12, wherein
a notch through which the tab passes is provided in the lid member, and
at least a part of the lid member exposed from the notch is not covered by the bonding member.

14. The battery cell according to claim 12, wherein
a hole through which the tab passes is provided in the lid member, and
the bonding member is provided between an outer circumferential surface of the tab and an inner circumferential surface of the hole.

15. The battery cell according to claim 9, further comprising:
a tab electrically connected to the battery element and drawn from the lid member; and
a barrier member provided at the lid member.

16. The battery cell according to claim 15, wherein,
when viewed from a drawn direction of the tab, the barrier member is provided in an area of equal to or more than 85% of an entire area of the lid member.

* * * * *